US011488103B1

(12) United States Patent
McDaniel et al.

(10) Patent No.: US 11,488,103 B1
(45) Date of Patent: Nov. 1, 2022

(54) CUSTOMIZED RETAIL ENVIRONMENTS

(71) Applicant: Amazon Technologies, Inc., Seattle, WA (US)

(72) Inventors: Aaron M. McDaniel, Seattle, WA (US); Joel Stirling, Everett, WA (US); Emily Marsden, Seattle, WA (US); Nirmal Doshi, Bothell, WA (US); Nathan P. O'Neill, Snohomish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/907,579

(22) Filed: Jun. 22, 2020

(51) Int. Cl.
| | |
|---|---|
| *G06K 7/10* | (2006.01) |
| *G06N 3/08* | (2006.01) |
| *G06Q 10/08* | (2012.01) |
| *G06Q 20/08* | (2012.01) |
| *G06T 7/70* | (2017.01) |
| *H04N 7/18* | (2006.01) |

(52) U.S. Cl.
CPC ....... *G06Q 10/087* (2013.01); *G06K 7/10366* (2013.01); *G06N 3/08* (2013.01); *G06Q 20/085* (2013.01); *G06T 7/70* (2017.01); *H04N 7/181* (2013.01); *G06T 2207/30196* (2013.01); *G06T 2207/30232* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 9,911,290 B1* | 3/2018 | Zalewski | G06Q 20/12 |
| 10,127,438 B1 | 11/2018 | Fisher et al. | |
| 10,133,933 B1 | 11/2018 | Fisher et al. | |
| 2013/0284806 A1 | 10/2013 | Margalit | |
| 2019/0156275 A1* | 5/2019 | Fisher | G06N 3/0454 |

* cited by examiner

*Primary Examiner* — Patricia I Young
(74) *Attorney, Agent, or Firm* — Lee & Hayes, P.C.

(57) ABSTRACT

This disclosure describes, in part, systems for enabling facilities to implement techniques to determine when users are in possession of items when located within and/or exiting the facilities. For instance, a system may use one or more sensors to determine locations of a user that navigated through a facility. Additionally, the system may use one or more sensors to determine locations of an item while the item was located within the facility. The system may then determine a probability that the user was in possession of the item when in the facility and/or when exiting the facility based at least in part on the locations of the user and the locations of the item. If the system determines that the user was in possession of the item when exiting the facility, the system may charge a payment instrument of the user for a price of the item.

20 Claims, 14 Drawing Sheets

TIMESTAMP
DATA
602

| SENSOR ID | DEVICE ID | ZONE | X LOCATION | Y LOCATION | Z LOCATION | TIME | RSSI | CONFIDENCE (%) |
|---|---|---|---|---|---|---|---|---|
| 3020103AB | 382717RG | ENTRANCE | 13.22 | 22.34 | 0.00 | 1:00 | 904 | 94 |
| 3020103AB | 382717RG | 1 | 44.78 | 10.22 | 0.00 | 1:05 | 878 | 86 |
| 3020103AB | 382717RG | 5 | 99.76 | 65.33 | 0.00 | 1:10 | 976 | 97 |
| 3020103AB | 382717RG | 3 | 33.90 | 70.88 | 0.00 | 1:15 | 899 | 90 |
| 3020103AB | 382717RG | 7 | 4.98 | 99.37 | 0.00 | 1:20 | 976 | 97 |
| 3020103AB | 382717RG | 10 | 44.87 | 43.21 | 0.00 | 1:25 | 950 | 95 |
| 3020103AB | 382717RG | EXIT | 81.22 | 22.48 | 0.00 | 1:30 | 978 | 98 |

TIMESTAMP
DATA
602

| SENSOR ID | DEVICE ID | ZONE | X LOCATION | Y LOCATION | Z LOCATION | TIME | RSSI | CONFIDENCE (%) |
|---|---|---|---|---|---|---|---|---|
| 3020103AB | 382717RG | ENTRANCE | 13.22 | 22.34 | 0.00 | 1:00 | 904 | 94 |
| 3020103AB | 382717RG | 1 | 44.78 | 10.22 | 0.00 | 1:05 | 878 | 86 |
| 3020103AB | 382717RG | 5 | 99.76 | 65.33 | 0.00 | 1:10 | 976 | 97 |
| 3020103AB | 382717RG | 3 | 33.90 | 70.88 | 0.00 | 1:15 | 899 | 90 |
| 3020103AB | 382717RG | 7 | 4.98 | 99.37 | 0.00 | 1:20 | 976 | 97 |
| 3020103AB | 382717RG | 10 | 44.87 | 43.21 | 0.00 | 1:25 | 950 | 95 |
| 3020103AB | 382717RG | EXIT | 81.22 | 22.48 | 0.00 | 1:30 | 978 | 98 |

FIG. 6

CUSTOMIZED RETAIL ENVIRONMENTS

BACKGROUND

Traditional physical stores maintain an inventory of items in customer-accessible areas such that customers can pick items from the inventory and take them to a cashier for purchase, rental, and so forth. For example, a customer may take an item, such as a shirt, from a rack located within the store. The customer may then take the shirt to a cashier that is located near an entrance of the store. Using a point-of-sale device, the cashier may process a transaction for a price of the shirt. For example, the cashier may input payment information, such as a card number, into the point-of-sale device, which may charge the card of the customer for the price of the shirt.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 illustrates an example of the type of information that may be included in timestamps for an item.

DETAILED DESCRIPTION

Figure 1A:
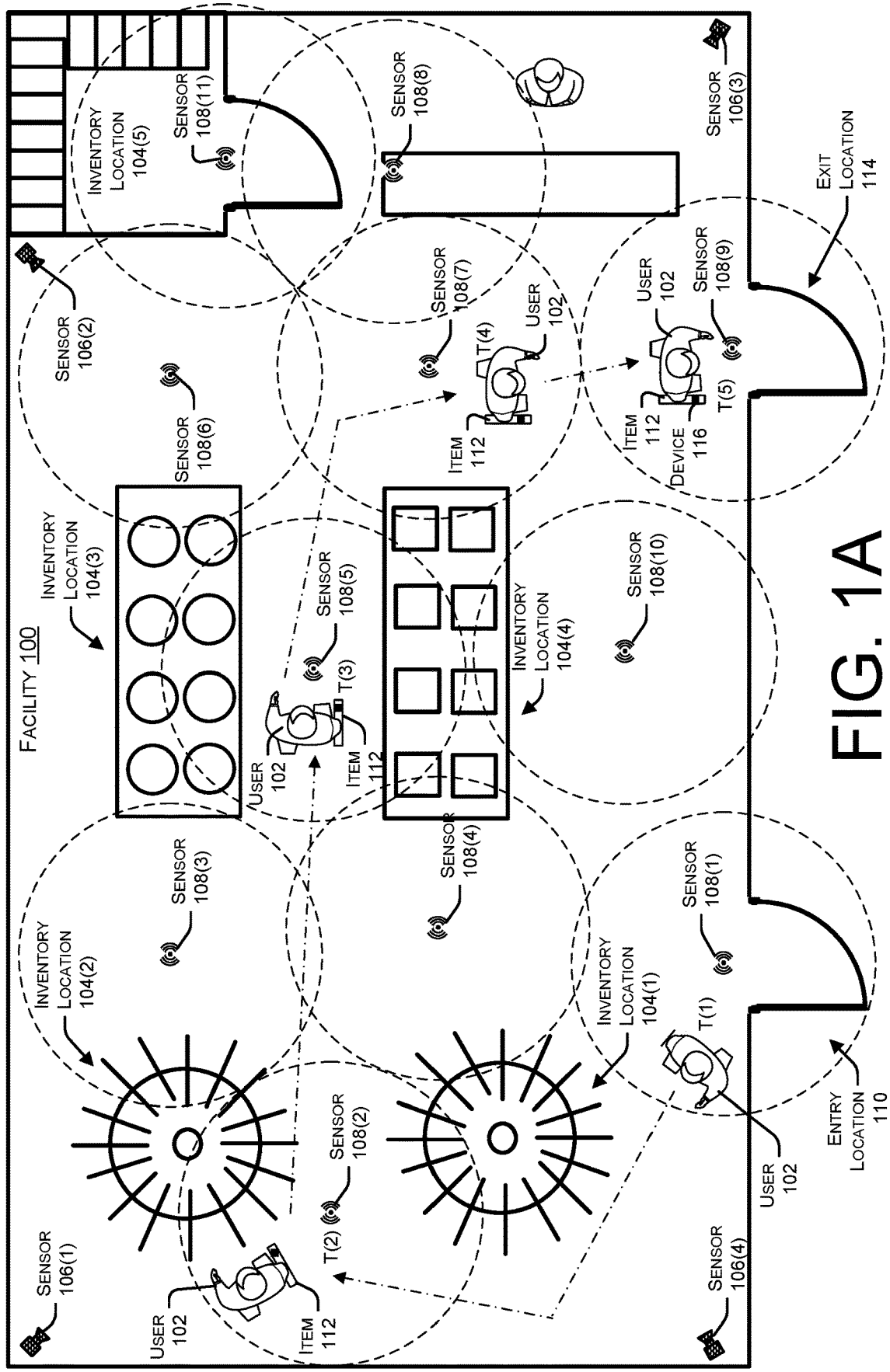
FIG. 1A illustrates an example facility associated with a system for enabling automated checkout (AC) techniques to allow users to enter the facility, remove items that are located at inventory locations within the facility, and exit the facility without performing a manual checkout of the items. In the example of FIG. 1A, the system determines locations of a user and an item while the user and item are located within the facility.

This disclosure describes, in part, systems for enabling facilities (e.g., physical retail stores) to implement technology that is able to automatically determine items that users possess when exiting facilities. By using this technology, the users are able to pick items from inventory locations (e.g., shelves, racks, cases, cabinets, bins, floor locations, etc.) and exit the facilities without performing manual checkout. For instance, a system may use sensors located within a facility, such as cameras, to determine locations of a user as (and/or after) the user navigates throughout the facility. The system may further use sensors located within the facility, such as signal receivers, to determine locations of an item throughout the facility. The system may then use the locations of the user as well as the locations of the item to determine that the user was in possession of the item while within the facility and/or while exiting the facility. As such, the system may associate an identifier of the item with an account of the user. Additionally, the system may use payment information, which may be stored in association with the account, to automatically process a transaction for the price of the item (e.g., process the transaction without manual checkout).

For more details, the user may enter the facility through an entry location, navigate through the facility looking for items, pick up an item (e.g., a shirt) from an inventory location within the facility, and exit the facility through an exit location. While in the facility, and at the knowledge and request/consent of the user, the system may use sensors (referred to, in these examples, as "first sensors") to determine locations of the user while traveling through the facility. For example, the system may use cameras, floor weight sensors, and/or the like to generate sensor data (referred to, in these examples, as "first sensor data"). The system may then analyze this first sensor data (e.g., image data) to locate the user as (and/or after) the user navigates through the facility. The system may then store, in association with the account of the user, timestamp data (referred to, in these examples, as "first timestamp data") representing at least times that the user was located at various locations within the facility.

Additionally, while the item is within the facility, the system may use sensors (referred to, in these examples, as "second sensors") to determine locations of the item within the facility. For example, the item may include an attached device, such as a tag (e.g., a radio-frequency identification (RFID) tag), that transmits signals. In some instances, the device transmits the signals at a given frequency. Additionally, or alternatively, in some instances, the device transmits the signals after receiving signals from the second sensors. In either of the instances, the facility may use the second sensors, such as RFID readers, to receive the signals from the device attached to the item. The system may then analyze sensor data (referred to, in these examples, as "second sensor data") to determine the locations of the item throughout the facility. Additionally, the system may store timestamp data (referred to, in these examples, as "second timestamp data") representing at least times that the item was located at various locations within the facility.

The system may then use the first timestamp data and the second timestamp data to determine whether the user was in possession of the item when exiting the facility. For example, the system may use the first timestamp data and the second timestamp data to identify one or more times that the item was located proximate to the user within the facility and one or more times that the item was not located proximate to the user within the facility. In some instances, the system may determine that the item was located proximate to the user when the item was located within a threshold distance (e.g., one meter, two meters, five meters, etc.) to the user and determine that the item was not located proximate to the user when the item was located outside of the threshold distance to the user. Additionally, or alternatively, in some instances, the system may determine that the item was located proximate to the user when the both the item and the user were located within a same area of the facility (e.g., a clothing isle, a shoe isle, at the exit location, etc.), and determine that the item was not located proximate to the user when the item was not located with the same area as the user.

Using these determinations, the system may determine whether the user was in possession of the item when exiting the facility. For example, the system may determine one or more probabilities that the user was in possession of the item when exiting the facility. For a probability, the system may increase the probability each time that the system determines that the item was located proximate to the user at a given time and decrease the probability each time the system determines that the item was not located proximate to the user at a given time. In some instances, the system may weigh certain locations more than other locations. For example, the system may give more weight when increasing the probability after determining that the item was located proximate to the user at a time that the user was exiting the facility. This is because these determinations may better indicate that the user was actually in possession of the item when exiting the facility.

For an example of determining a probability, the system may determine that the item was located proximate to the user at a first time (e.g., when the item was pickup up from the inventory location). As such, the system may determine that there is a 50% probability that the user was in possession of the item. The system may then determine that the item was located proximate to the user at a second, later time. As such, the system may determine that there is a 70% probability that the user was in possession of the item. Next, the system may determine that the item was located proximate to the user at a third, later time. The third time may correspond to when the user exited the facility and as such, the system may provide more weight to this determination. As such, the system may determine that there is a 99.9% probability that the user was in possession of the item when exiting the facility.

The system may then use the probability to determine whether the user was in possession of the item at the time of exiting the facility. In some instances, the system may determine that the user was in possession of the item when the probability satisfies (e.g., is equal to or greater than) a threshold probability (e.g., 98%, 99%, etc.), and determine that the user was not in possession of the item when the probability does not satisfy (e.g., is less than) the threshold probability. For example, and using the example above, the system may determine that the user was in possession of the item when exiting the facility based on the 99.9% probability satisfying a threshold probability of 99%. As will be discussed in more detail below, when the system determines that the user was in possession of the item, the system may store data representing an identifier of the item in association with the account of the user and/or process a transaction for a price of the item.

In some instances, in addition to, or alternatively from, using the locations of the user and the locations of the item to determine whether the user was in possession of the item when exiting the facility, the system may use direction(s) of movement of the user and direction(s) of movement of the item. For example, the system may use the locations of the user within the facility to determine the direction(s) of movement of the user within the facility. For instance, the direction(s) of movement may indicate that the user walked north within the facility for a first distance and/or during a first time, then walked west within the facility for a second distance and/or during a second time, then walked southeast within the facility for a third distance and/or during a third time, and then walked south within the facility for a fourth distance and/or during a fourth time.

The system may also use the locations of the item within the facility to determine the direction(s) of movement of the item within the facility. For instance, the direction(s) of movement may indicate that the item was stationary during the first time, then moved west within the facility for a fifth distance and/or during the second time, then moved southeast within the facility for a sixth distance and/or during the third time, and then moved south within the facility for a seventh distance and/or during the fourth time. The system may then use the direction(s) of movement of the user and the direction(s) of movement for the item to determine that the user was in possession of the item when leaving the facility.

For example, the system may determine that, during the second time, the user and the item moved in approximately the same distance (e.g., west) and/or moved approximately the same distance (e.g., the second distance is approximately equal to the fifth distance). As such, the system may determine a first probability that the user was in possession of the item during the first time. The system may then determine that, during the third time, the user and the item moved in approximately the same distance (e.g., southeast) and/or moved approximately the same distance (e.g., the third distance is approximately equal to the sixth distance). As such, the system may determine a second, greater probability that the user was in possession of the item during the third time. Next, the system may determine that, during the fourth time, the user and the item moved in approximately the same distance (e.g., south) and/or moved approximately the same distance (e.g., the fourth distance is approximately equal to the seventh distance). As such, the system may determine a third, greater probability that the user was in possession of the item during the fourth time. The system may then use the processes described above to analyze the third probability in order to determine that the user was in possession of the item when exiting the facility.

In some instances, the system may perform similar processes to determine whether one or more additional users were in possession of the item when exiting the facility. For example, the system may analyze the sensor data described above to determine one or more times that the item was located proximate to a second user (and/or associate) within the facility and/or one or more times that the item was not located proximate to the second user within the facility. The system may then use these determinations to determine one or more probabilities for the second user.

For example, and using the example above with the user, the system may determine that the item was located proximate to the second user at the first time (e.g., when the item was pickup up from the inventory location). As such, and similar to the user, the system may determine that there is a 50% probability that the second user was in possession of the item at the first time. The system may then determine that the item was not located proximate to the second user at the second time. As such, the system may determine that there is a 30% probability that the second user was in possession of the item at the second time. Next, the system may determine that the item was not located proximate to the second user at a fourth time. The fourth time may correspond to when the second user leaves the facility and as such, the system may provide more weight to this determination. As such, the system may determine that there is a 1% probability that the second user was in possession of the item when exiting the facility. The system may then determine that the second user was not in possession of the item when exiting the facility based on the probability of the second user being less than the probability of the user and/or based on the probability of the second user not satisfying the threshold probability.

In some instances, the system may use locations of other objects within the facility to determine that the user was possession of the item when exiting the facility. For example, the user may use a tote, such as a shopping cart, while in the facility. Similar to the item, the tote may also include a device that outputs signals that the system may use to determine the locations of the tote within the facility. The system may then determine that the tote is associated with the user. In some instances, the system makes the determination based on the locations of the tote being proximate to the locations of the user, similar to the processes described above with respect to the item. Additionally, or alternatively, in some instances, the system makes the determination based on analyzing sensor data (e.g., image data) and, based on the analysis, determining that the user is in possession of the tote (e.g., determining that the user was located proximate to the tote while within the facility).

The system may then use the association between the user and the tote to determine that the user was in possession of the item while in the facility and/or while exiting the facility. For a first example, the tote may include one or more sensors (e.g., cameras, signal readers, etc.) that detect items located within the tote. As such, the tote may detect the item using the one or more sensors and, based on the tote detecting the item and the association between the user and the tote, the system may determine that the user was in possession of the item. For a second example, the system may use the locations of the tote and the locations of the item to determine that the item was located within the tote, similar to the processes described above with regard to how the system determines that the user was in possession of the item. As such, the system may further use the association between the user and the tote to determine that the user was in possession of the item.

In some instances, the system may use one or more additional sensors when determining whether the user was in possession of the item. For example, when the user initially removes the item from the inventory location, a sensor, such as a weight sensor, may send sensor data to the system. The system may analyze this sensor data to determine that the item was removed from the inventory location at a given time. The system may also analyze the first sensor data to determine that the user was located proximate to the inventory location at the given time (e.g., using similar processes as the system uses to determine that the item was located proximate to the user, which are described above). As such, the system may determine that it was the user that removed the item from the inventory location. The system may use this determination when determining the probability that the user was in possession of the item when exiting the facility. For example, the system may increase the probability.

In some instances, the system may use the locations of the item within the facility for various other reasons. For a first example, if the system determines that the item has stopped moving within the facility, the system may determine that the user has returned the item to the inventory location (e.g., if the location of the item is proximate to the inventory location) or that the user has left the item at a different inventory location within the facility (e.g., if the location of the item is proximate to the other inventory location). As such, the system may notify an associate of the facility of the location of the item and/or that the associate should return the item to the proper inventory location. As described herein, the system may determine that the item has stopped moving within the facility when the location of the item does not change for a threshold period of time (e.g., five minutes, ten minutes, thirty minutes, etc.).

For more detail about the facility, customized retail facilities include inventory locations housing one or more items that may be ordered, received, picked, and/or returned by users. These inventory locations may be associated with one or more sensors configured to generate sensor data indicative of events that occur with respect to the items housed thereupon. For example, these sensors may generate sensor data indicative of a user (and/or associated of the facility) removing an item from the inventory location, returning the item to the inventory location, and/or the like. These sensors may include overhead cameras, in-shelf cameras, weight sensors, and/or any other type of sensor configured to generate sensor data indicative of user interactions with the items. An inventory management system (e.g., the system) may communicate with the sensors in order to receive the sensor data.

In addition, the facility may include, in some instances, one or more entry locations for entering the facility and one or more exit locations for exiting the facility. For example, the facility may include an AC entry location at which an entering user provides information for identifying an account of the user. For instance, the AC entry location may include a scanner or other imaging device at which an entering user scans or otherwise provides a unique code associated with the account of the user, such as a code displayed on a mobile device of the user. Or, the entry location may include a microphone, camera, or other sensor that generates sensor data at the request of the user for use in identifying the account of the user. In still other instances, the AC entry location may include an input device for reading information from a payment card of a user, such as a credit card, debit card, prepaid card, etc. For example, the AC entry location may include a scanner or camera that scans or captures an image of a payment card, a card reader that receives information from a payment card via a swipe, dip, tap, or the like, or may include any other type of input device configured to receive payment or account information.

In some instances, the account of the user may be associated with a payment instrument of the user such that the payment instrument is able to be charged for items procured by the user, with the charge occurring automatically upon exit of the facility by the user and without the user needing to engage in a manual checkout process of the items. Accordingly, the facility may include an AC exit location where an exiting user provides information for identifying an account of the exiting user. The AC exit location may include, similar to the AC entry location, a scanner or other imaging device at which the exiting user scans or otherwise provides a unique code associated with the account of the user, such as the code displayed on the mobile device of the user. Or, the AC exit location may include a microphone, camera, or other sensor that generates sensor data at the request of the user for use in identifying the account of the exiting user.

Note that the facility may also include entry and exit locations at which users may enter and exit without providing identifying information. For instance, users may be allowed access to the facility in a manner similar to a traditional retail facility to allow users to shop or otherwise interact with items at the retail facility without needing to provide information for identifying user accounts. In some examples, the user may be allowed to enter the facility, then provide information for identifying a user account at an ordering location within the facility. Also, at least one exit location may resemble a traditional exit location at a retail facility, including an associate of the facility operating a point of sale (POS) device to manually check out the exiting user, such as an exiting user wishing to pay for items in cash. Of course, it is to be appreciated that the facility may include self-checkout kiosks or any other technology for enabling manual checkout of the items within the facility.

Within this example facility, if a user enters through an AC entry location and provides information identifying an account of the user, or the user enters the facility and provides information identifying the account of the user at an ordering location, then the system associated with the facility may generate a record indicating the presence of the user at the facility. The record may store an indication of the identity of the user, as well as an indication of whether the user is currently eligible to exit the facility (with items procured by the user) via the AC exit location.

Upon finishing his or her shopping, the user may approach the AC exit location and, in some instances, scan or otherwise provide identifying information to enable the system to identify the exiting user. After scanning his or her unique code at the AC exit location, for instance, the user may exit the facility. The system, meanwhile, may thereafter charge an account of the identified exiting user for a price of the items procured by the user within the facility. Of course, while the above example describes the user scanning a unique code (e.g., via a mobile device of the user), it is to be appreciated that the exiting user may be identified based at least in part on other sensor data, such as image data, voice data, or the like.

While some of the examples below are described with reference to a materials handling facility (e.g., a brick-and-mortar retail store, a fulfillment center, etc.), the systems and techniques may be implemented for detecting events in any type of facility, an airport, a classroom, an outdoor environment, an amusement park, or any other location. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

As described herein, a threshold distance may include, but is not limited to, one meter, two meters, five meters, and/or any other distance. Additionally, a threshold period of time may include, but is not limited to, five minutes, ten minutes, thirty minutes, and/or any other time period.

FIG. 1A illustrates an example facility 100 associated with a system for enabling automated checkout (AC) techniques to allow users, such as an example user 102, to enter the facility 100, order and/or pick one or more items, and exit the facility without performing a manual checkout of the items. To do so, the system coupled to the environment may identify the user 102 and charge an account associated with the user 102 for a price of the ordered and/or picked items upon exit of the user 102.

As illustrated in FIG. 1A, the example facility 100 includes inventory locations 104(1)-(5) (also referred to as "inventory locations 104"). For example, the inventory locations 104(1)-(2) may include racks that hold items (e.g., clothes), the inventory locations 104(3)-(4) may include tables that hold items (e.g., sporting equipment), and the inventory location 104(5) may include a storage room that holds items (e.g., shoes). While these are just a couple examples of inventory locations 104 that may be located within the facility 100, in other examples, the facility 100 may include any number and/or type of inventory locations.

The facility 100 may also include first sensors 106(1)-(4) (also referred to as "first sensors 106") and second sensors 108(1)-(11) (also referred to as "second sensors 108") located throughout the facility 100. In the example of FIG. 1A, the first sensors 106 may include cameras and the second sensors 108 may include signal readers, such as RFID readers. However, in other examples, the first sensors 106 and/or the second sensors 108 may include any other type of sensor, such as microphones, weight sensors, and/or the like. Additionally, in other examples, the facility 100 may include any number of the first sensors 106 and/or any number of the second sensors 108. For example, the facility 100 may only include the second sensors 108 at the entrance/exit of the facility 100.

In the example of FIG. 1A, upon the user 102 entering the facility 100 via an entry location 110 and at a first time ($T_1$), the system may generate a record indicating an identifier associated with the user 102. This record may be continuously or periodically updated by a locating component of the system to generate current location data of the user 102 within the facility 100, at the prior consent/request of the user 102. For example, the system may receive, from the first sensors 106 (e.g., the first sensor 106(4)), sensor data representing the user 102 at the first time $T_1$. The system may then analyze the sensor data to determine that the user 102 was located at a first location within the facility 100 at the first time $T_1$. Additionally, the system may receive, from the second sensors 108 (e.g., the second sensor 108(2)), sensor data representing an item 112 at the first time $T_1$. The system may then analyze the sensor data to determine that the item 112 was located at a second location within the facility at the first time $T_1$.

In the example of FIG. 1A, the user 102 enters the facility 100 and proceeds to the inventory location 104(2). As such, and at a second time ($T_2$), the user 102 removes the item 112 from the inventory location 104(2). The system may then receive, from the first sensors 106 (e.g., the first sensor 106(1)), sensor data representing the user 102 at the second time $T_2$. The system may then analyze the sensor data to determine that the user 102 was located at a third location within the facility 100 at the second time $T_2$. Additionally, the system may receive, from the second sensors 108 (e.g., the second sensor 108(2)), sensor data representing the item 112 at the second time $T_2$. The system may then analyze the sensor data to determine that the item 112 was located at a fourth location within the facility at the second time $T_2$.

At a third time ($T_3$), the user 102 moves from the third location within the facility 100 to a fifth location within the facility 100. As such, the system may receive, from the first sensors 106 (e.g., the first sensor 106(2)), sensor data representing the user 102 at the third time $T_3$. The system may then analyze the sensor data to determine that the user 102 was located at the fifth location within the facility 100 at the third time $T_3$. Additionally, the system may receive, from the second sensors 108 (e.g., the second sensor 108 (5)), sensor data representing the item 112 at the third time $T_3$. The system may then analyze the sensor data to determine that the item 112 was located at a sixth location within the facility at the third time $T_3$.

Next, a fourth time ($T_4$), the user 102 moves from the fifth location within the facility 100 to a seventh location within the facility 100. As such, the system may receive, from the first sensors 106 (e.g., the first sensor 106(3)), sensor data representing the user 102 at the fourth time $T_4$. The system may then analyze the sensor data to determine that the user 102 was located at the seventh location within the facility 100 at the fourth time $T_4$. Additionally, the system may receive, from the second sensors 108 (e.g., the second sensor 108(7)), sensor data representing the item 112 at the fourth time $T_4$. The system may then analyze the sensor data to determine that the item 112 was located at an eighth location within the facility at the fourth time $T_4$.

Finally, a fifth time ($T_5$), the user 102 may exit the facility 100 through an exit location 114. As such, the system may receive, from the first sensors 106 (e.g., the first sensor 106(3)), sensor data representing the user 102 at the fifth time $T_5$. The system may then analyze the sensor data to determine that the user 102 was located at a ninth location within the facility 100 at the fifth time $T_5$. Additionally, the system may receive, from the second sensors 108 (e.g., the second sensor 108(9)), sensor data representing the item 112 at the fifth time $T_5$. The system may then analyze the sensor data to determine that the item 112 was located at a tenth location within the facility at the fifth time $T_5$.

In some instances, the system may be generating timestamps indicating at least the locations of the user 102 and/or the locations of the item 112. For example, the system may generate timestamps indicating that the user 102 was located at the first location at the first time $T_1$, the user 102 was located at the third location at the second time $T_2$, the user 102 was located at the fifth location at the third time $T_3$, the user 102 was located at the seventh location at the fourth time $T_4$, and the user 102 was located at the ninth location at the first time $T_5$. Additionally, the system may generate timestamps indicating that the item 112 was located at the second location at the first time $T_1$, the item 112 was located at the fourth location at the second time $T_2$, the item 112 was located at the sixth location at the third time $T_3$, the item 112 was located at the eighth location at the fourth time $T_4$, and the item 112 was located at the tenth location at the first time $T_5$.

As further illustrated in the example of FIG. 1A, the item 112 includes a device 116, such as a tag (e.g., an RFID tag), the transmits signals (e.g., data) that are received by the second sensors 108. In some instances, the device 116 transmits the signals at a given frequency. Additionally, or alternatively, in some instances, the device 116 transmits the signals after receiving signals from the second sensors 108. In either of the instances, the signals may represent at least an identifier associated with the device 116, where the system can use the identifier to identify the device 116 and/or the item 112. In some instances, the signals may further represent an identifier associated with the item 112.

Figure 1B:
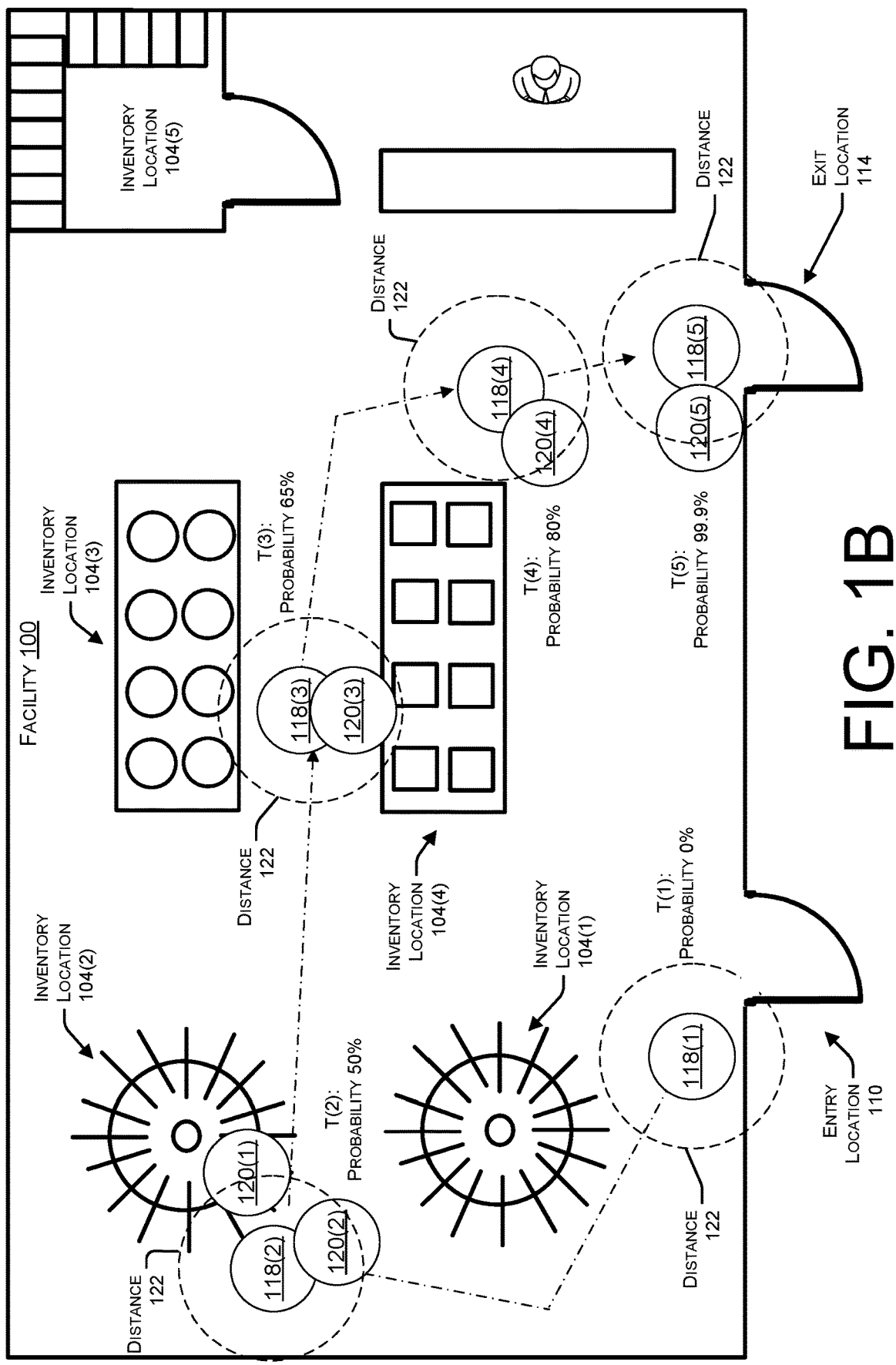
FIG. 1B illustrates an example of the system determining that the user was in possession of the item while within the facility and/or while exiting the facility.

FIG. 1B illustrates an example of determining that the user 102 was in possession of the item 112 while within the facility 100 and/or while exiting the facility 100. For example, FIG. 1B illustrates the locations 118(1)-(5) (also referred to as the "locations 118") of the user 102 as detected by the system while the user 102 was navigating through the facility 100. Additionally, FIG. 1B illustrates the locations 120(1)-(5) (also referred to as the "locations 120") of the item 112 as detected by the system while the user 102 was navigating through the facility 100. The system may use the locations 118 of the user 102 and the locations 120 of the item 112 to determine that the user 102 was in possession of the item 112 while within the facility 100 and/or when exiting the facility 100.

For example, the system may determine that the item 112 was not located proximate to the user 102 at the first time $T_1$. In some instances, the system makes the determination based on the location 120(1) of the item 112 being located outside of a threshold distance 122 to the location 118(1) of the user 102 at the first time $T_1$. Based on the determination, the system may determine that there is a 0% probability that the user 102 was in possession of the item 112 at the first time $T_1$.

The system may then determine that the item 112 was located proximate to the user 102 at the second time $T_2$. In some instances, the system makes the determination based on the location 120(2) of the item 112 being located within the threshold distance 122 to the location 118(2) of the user 102 at the second time $T_2$. Based on the determination, the system may determine that there is a 50% probability that the user 102 was in possession of the item 112 at the second time $T_2$.

Next, the system may determine that the item 112 was located proximate to the user 102 at the third time $T_3$. In some instances, the system makes the determination based on the location 120(3) of the item 112 being located within the threshold distance 122 to the location 118(3) of the user 102 at the third time $T_3$. Based on the determination, the system may determine that there is a 65% probability that the user 102 was in possession of the item 112 at the third time $T_3$.

Additionally, the system may determine that the item 112 was located proximate to the user 102 at the fourth time $T_4$. In some instances, the system makes the determination based on the location 120(4) of the item 112 being located within the threshold distance 122 to the location 118(4) of the user 102 at the fourth time $T_4$. Based on the determination, the system may determine that there is a 80% probability that the user 102 was in possession of the item 112 at the fourth time $T_4$.

Finally, the system may determine that the item 112 was located proximate to the user 102 at the fifth time $T_5$. In some instances, the system makes the determination based on the location 120(5) of the item 112 being located within the threshold distance 122 to the location 118(5) of the user 102 at the fifth time $T_5$. Additionally, the system may determine that the user 102 was exiting the facility 100 at the fifth time $T_5$. As such, the system may provide more weight to this determination when determining the probability. Based on the determinations, the system may determine that there is a 99.9% probability that the user 102 was in possession of the item 112 at the fifth time $T_5$.

In some instances, the system may then determine that the user 102 was in possession of the item 112 when exiting the facility based on the 99.9% probability satisfying a threshold probability, such as 99%. The system may then store data (e.g., event data) that associates an identifier of the item 112 with the account of the user 102. Additionally, the system may use payment information, which may be stored in association with the account of the user 102, to process a transaction for a price of the item 112.

Figure 1C:
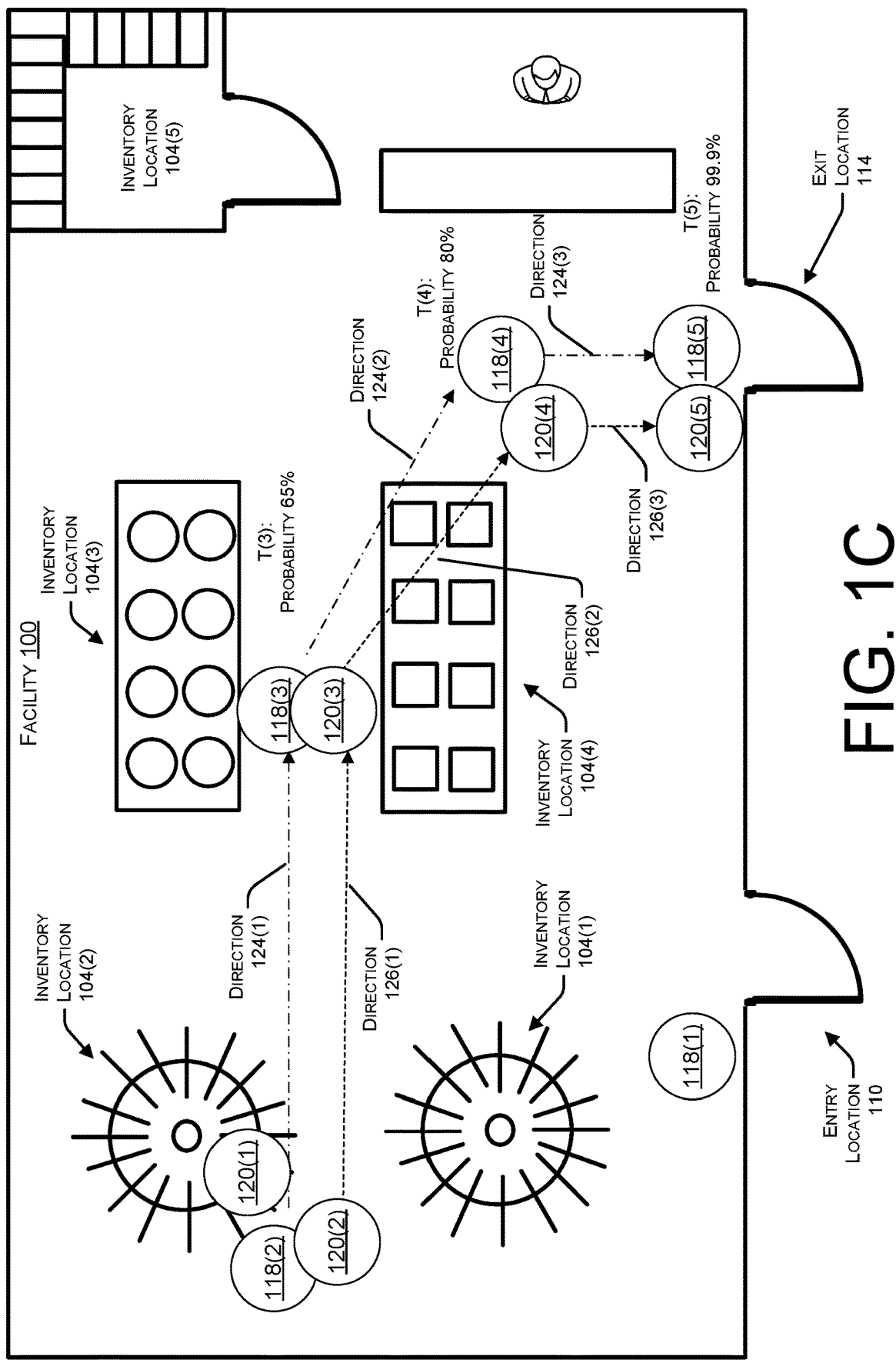
FIG. 1C illustrates an example of the system determining that the user was in possession of the item using directions of movement of the user and the item.

FIG. 1C illustrates another example of determining that the user 102 was in possession of the item 112 while within the facility 100 and/or while exiting the facility 100. For example, FIG. 1C also illustrates the locations 118 of the user 102 as detected by the system while the user 102 was navigating through the facility 100. Additionally, FIG. 1C also illustrates the locations 120 of the item 112 as detected by the system while the user 102 was navigating through the facility 100. However, in the example of FIG. 1C, the system uses the locations 118 to determine directions of movement 124(1)-(3) of the user 102 and sues the locations 120 to determine directions of movement 126(1)-(3) of the item 112 within the facility 102. The system then uses the directions of movement 124(1)-(3) and the directions of movement 126(1)-(3) to determine whether the user 102 was in possession of the item 112 when exiting the facility 102.

For example, the system may determine the first direction of travel 124(1) of the user 102 during a first period of time, where the first period of time is between the second time $T_2$ and the third time $T_3$. The first direction of travel 124(1) may include a first direction (e.g., east) and a first distance. The system may also determine the first direction of travel 126(1) of the item 112 during the first period of time. The first direction of travel 126(1) may include a second direction (e.g., east) and a second distance. The system may then determine that the first direction of travel 124(1) of the user 102 corresponds to the first direction of travel 126(1) of the item 112. In some instances, the system makes the determination based on the first direction being approximately equal to the second direction. Additionally, or alternatively, in some instances, the system makes the determination based on the first distance being approximately equal to the second distance. In either instance, based on the first direction of travel 124(1) of the user 102 corresponding to the first direction of travel 126(1) of the item 112, the system may determine the first probability at the third time $T_3$.

The system may determine the second direction of travel 124(2) of the user 102 during a second period of time, where the second period of time is between the third time $T_3$ and the fourth time $T_4$. The second direction of travel 124(2) may include a third direction (e.g., southeast) and a third distance. The system may also determine the second direction of travel 126(2) of the item 112 during the second period of time. The second direction of travel 126(2) may include a fourth direction (e.g., southeast) and a fourth distance. The system may then determine that the second direction of travel 124(2) of the user 102 corresponds to the second direction of travel 126(2) of the item 112. In some instances, the system makes the determination based on the third direction being approximately equal to the fourth direction. Additionally, or alternatively, in some instances, the system makes the determination based on the third distance being approximately equal to the fourth distance. In either instance, based on the second direction of travel 124(2) of the user 102 corresponding to the second direction of travel 126(2) of the item 112, the system may determine the second probability at the fourth time $T_4$.

Next, the system may determine the third direction of travel 124(3) of the user 102 during a third period of time, where the third period of time is between the fourth time $T_4$ and the fifth time $T_5$. The third direction of travel 124(3) may include a fifth direction (e.g., south) and a fifth distance. The system may also determine the third direction of travel 126(3) of the item 112 during the third period of time. The third direction of travel 126(3) may include a sixth direction (e.g., south) and a sixth distance. The system may then determine that the third direction of travel 124(3) of the user 102 corresponds to the third direction of travel 126(3) of the item 112. In some instances, the system makes the determination based on the fifth direction being approximately equal to the sixth direction. Additionally, or alternatively, in some instances, the system makes the determination based on the fifth distance being approximately equal to the sixth distance. In either instance, based on the third direction of travel 124(3) of the user 102 corresponding to the third direction of travel 126(3) of the item 112, the system may determine the third probability at the fifth time $T_5$.

In some instances, the system may then determine that the user 102 was in possession of the item 112 when exiting the facility based on the 99.9% probability satisfying a threshold probability, such as 99%. The system may then store data (e.g., event data) that associates an identifier of the item 112 with the account of the user 102. Additionally, the system may use payment information, which may be stored in association with the account of the user 102, to process a transaction for a price of the item 112.

It should be noted that, as described herein, a first distance may be approximately equal to a second distance when the first distance is within a threshold distance to the second distance. Additionally, a first direction may be approximately equal to a second direction when the first direction is within a threshold angle to the second distance. The threshold angle may include, but is not limited to, 1 degree, 5 degrees, 10 degrees, and/or any other distance.

The system may then determine that the item 112 was located proximate to the user 102 at the second time $T_2$. In some instances, the system makes the determination based on the location 120(2) of the item 112 being located within the threshold distance 122 to the location 118(2) of the user 102 at the second time $T_2$. Based on the determination, the system may determine that there is a 50% probability that the user 102 was in possession of the item 112 at the second time $T_2$.

Next, the system may determine that the item 112 was located proximate to the user 102 at the third time $T_3$. In some instances, the system makes the determination based on the location 120(3) of the item 112 being located within the threshold distance 122 to the location 118(3) of the user 102 at the third time $T_3$. Based on the determination, the system may determine that there is a 65% probability that the user 102 was in possession of the item 112 at the third time $T_3$.

Additionally, the system may determine that the item 112 was located proximate to the user 102 at the fourth time $T_4$. In some instances, the system makes the determination based on the location 120(4) of the item 112 being located within the threshold distance 122 to the location 118(4) of the user 102 at the fourth time $T_4$. Based on the determination, the system may determine that there is a 80% probability that the user 102 was in possession of the item 112 at the fourth time $T_4$.

Finally, the system may determine that the item 112 was located proximate to the user 102 at the fifth time $T_5$. In some instances, the system makes the determination based on the location 120(5) of the item 112 being located within the threshold distance 122 to the location 118(5) of the user 102 at the fifth time $T_5$. Additionally, the system may determine that the user 102 was exiting the facility 100 at the fifth time $T_5$. As such, the system may provide more weight to this determination when determining the probability. Based on the determinations, the system may determine that there is a 99.9% probability that the user 102 was in possession of the item 112 at the fifth time $T_5$.

In some instances, the system may then determine that the user 102 was in possession of the item 112 when exiting the facility based on the 99.9% probability satisfying a threshold probability, such as 99%. The system may then store data (e.g., event data) that associates an identifier of the item 112 with the account of the user 102. Additionally, the system may use payment information, which may be stored in association with the account of the user 102, to process a transaction for a price of the item 112.

Figure 2:
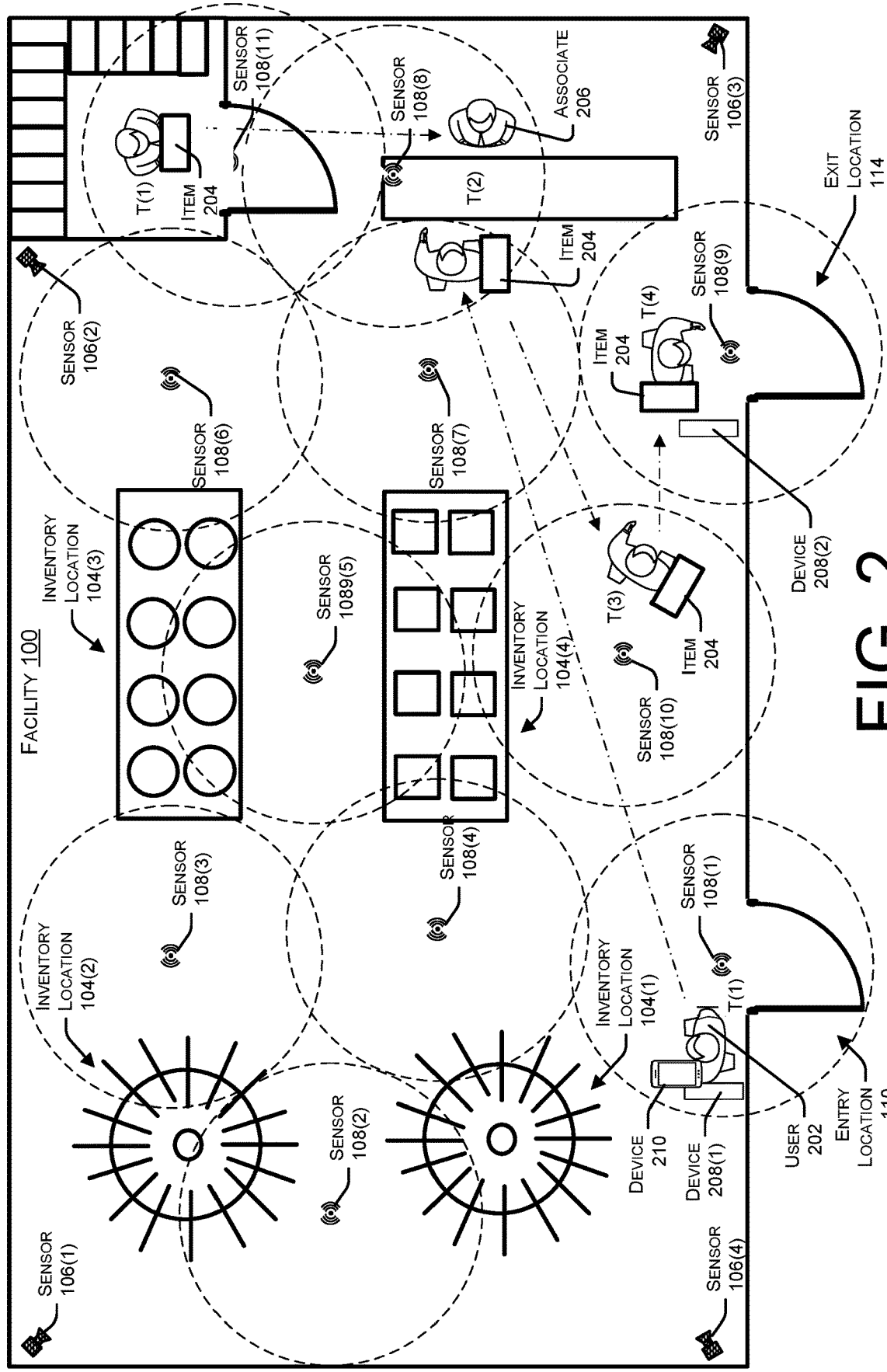
FIG. 2 illustrates the example facility of FIG. 1A. In the example of FIG. 2, a user orders an item from an associate of the facility. The system then uses sensor data to determine that the user was possession of the item when exiting the facility.

FIG. 2 illustrates the example facility of FIG. 1A. In the example of FIG. 2, a user 202 orders an item 204 from an associate 206 of the facility 100. The system then uses sensor data to determine that the user 202 was in possession of the item 204 when exiting the facility 100. In the example of FIG. 2, the facility 100 now includes devices 208(1)-(2) (also referred to as "devices 208"), which may include various types of scanning devices and/or electronic devices to help facilitate AC techniques. The device 208(1) may be associated with the entry location 110 and the device 208(2) may be associated with the exit location 114.

In the example of FIG. 2, the entry location 110 may request that entering users provide identifying information prior to entering the facility 100. In the illustrated example, the user 202 enters through the entry location 110 by scanning a unique code presented on a mobile device 210 of the user 202, such as at the scanning device 208(1) at the entry location 110. The scanning device 208(1) may provide this information to the system, which may use this information for identifying an identifier associated with the entering user 202. Of course, while this example describes identifying the identifier associated with the user 202 based at least in part on the user 202 scanning an unique code presented on the mobile device 210, the system may additionally, or alternatively, identify the identifier associated with the user 202 based on voice data (e.g., the user 402 stating the identifier), image data, password data (e.g., an alphanumeric string), credit card data, and/or any other type of data. For instance, the system may identify the identifier associated with the user 202 based on data provided by the device 208(1).

For instance, the user 202 may enter the facility 100 at a first time ($T_1$). The system may analyze sensor data to determine that the user 202 was located at a first location, the associate 206 was located at a second location, and the item 204 was located at a third location at the first time $T_1$. The system may then determine that the item 204 was not located proximate to the user 202 at the first time $T_1$. As such, the system may determine that there is a first probability (e.g., 0%) that the user 202 was in possession of the item 204 at the first time $T_1$. The system may also determine that the item 204 was located proximate to the associate 206 at the first time $T_1$. As such, the system may determine that there is a second probability (e.g., 50%) that the associate 206 was in possession of the item 204 at the first time $T_1$.

The user 102 may then order and receive the item 204 from the associate at a second time ($T_2$). Additionally, the system may analyze sensor data to determine that the user 202 was located at a fourth location, the associate 206 was located at a fifth location, and the item 204 was located at a sixth location at the second time $T_2$. The system may then determine that the item 204 was located proximate to the user 202 at the second time $T_2$. As such, the system may determine that there is a third probability (e.g., 50%) that the user 202 was in possession of the item 204 at the second time $T_2$. The system may also determine that the item 204 was located proximate to the associate 206 at the second time $T_2$. As such, the system may determine that there is a fourth probability (e.g., 70%) that the associate 206 was in possession of the item 204 at the second time $T_2$.

Next, the user 202 may move to a different location within the facility 100 at a third time ($T_3$). Additionally, the system may analyze sensor data to determine that the user 202 was located at seventh location, the associate 206 was located at an eighth location, and the item 204 was located at a ninth location at the third time $T_3$. The system may then determine that the item 204 was located proximate to the user 202 at the third time $T_3$. As such, the system may determine that there is a fifth probability (e.g., 70%) that the user 202 was in possession of the item 204 at the third time $T_3$. The system may also determine that the item 204 was not located proximate to the associate 206 at the third time $T_3$. As such, the system may determine that there is a sixth probability (e.g., 30%) that the associate 206 was in possession of the item 204 at the third time $T_3$.

Finally, the user 202 may exit the facility 100 at a fourth time ($T_4$). The system may analyze sensor data to determine that the user 202 was located at a tenth location, the associate 206 was located at an eleventh location, and the item 204 was located at a twelfth location at the fourth time $T_4$. The system may then determine that the item 204 was located proximate to the user 202 at the fourth time $T_4$. As such, the system may determine that there is a seventh probability (e.g., 99.9%) that the user 202 was in possession of the item 204 at the fourth time $T_4$. The system may also determine that the item 204 was not located proximate to the associate 206 at the fourth time $T_4$. As such, the system may determine that there is an eighth probability (e.g., 1%) that the associate 206 was in possession of the item 204 at the fourth time $T_4$.

In the example of FIG. 2, the user 202 may provide identifying information when exiting the facility 100. For example, similar to the entry location 110, the exit location 114 may include the device 208(2) that enables the user 202 to scan a unique code from his or her mobile phone 210, or provide any other type of identifying information. In still other instances, the user 202 may walk out and the system may identify the identifier associated with the user 102 using other types of sensor data.

In either instance, and in response to the user 202 attempting to exit the facility 100, the system may identify the record associated with the user 202, determine that the user 202 is eligible to "just walk out", and end a shopping session of the user 202. As such, the system may then process a corresponding transaction, such as charging an account (e.g., a payment instrument, an account previously associated at the system, etc.) of the user 202 for the price of the item 204 listed on the virtual cart of the user 202. The transaction processing may also include supplying a notification and/or receipt or other record of the transaction to the user 202, such as on their mobile device 210. Note that the facility 100 also may offer the user 202 a selection of methods to pay upon exit.

It should be noted that, in the example of FIG. 2, the inventory location 104(5) (e.g., the room where the associate 206 is located at the first time $T_1$) may not include specific sensors, such as cameras that provide a visual look into the inventory location 104(5). However, the system is still able to determine the location of the item 204 using the sensor 108(11). This may be important for other areas of facilities where cameras cannot be located, but it is important to determine the locations of items within the areas. For example, a changing room may include a signal reader that is capable of receiving signals from devices that are attached to items, but will not include a camera. As such, the system is still able to determine when specific items are located within the changing room. This may help the system identify theft that occurs within the facility 100.

For example, a user may take an item into the changing room and then remove the device that is attached to the item. The user may then leave the facility while still in possession of the item. Since the device is still located within the changing room, a signal reader associated with the changing room may continue to receive signals from the device indicating that the device is still located within the changing room. The system may then use the sensor data to determine that the item and/or the device have been left in the changing room by the user. In some instances, the system makes the determination based on the signal reader receiving the signals for a threshold period of time (e.g., 1 minute, 5 minutes, 10 minutes, etc.).

In response, the system may notify an associate of the store that the item should still be located within the changing room. As such, the associate may enter the changing room in order to retrieve and return the item. However, since the user already left the facility while in possession of the item, the associate may only find the device within the changing room. As such, the system may perform one or more processes. For a first example, the system may analyze other sensor data, such as image data representing area(s) outside of the changing room, to determine that the user walked towards the changing room with the item and then walked away from the changing room still in possession of the item (and/or left the facility with the item). As such, the system may charge the account of the user for the item. For a second example, the system may again analyze the other sensor data to determine that the user walked towards the changing room with the item. However, if the user is hiding the item, then the system may not be able to determine that the user was in possession of the item when walking away from the changing room and/or exiting the facility. Still, the system may determine that it was likely that the user took the item and store data associated with the event.

Figure 3:
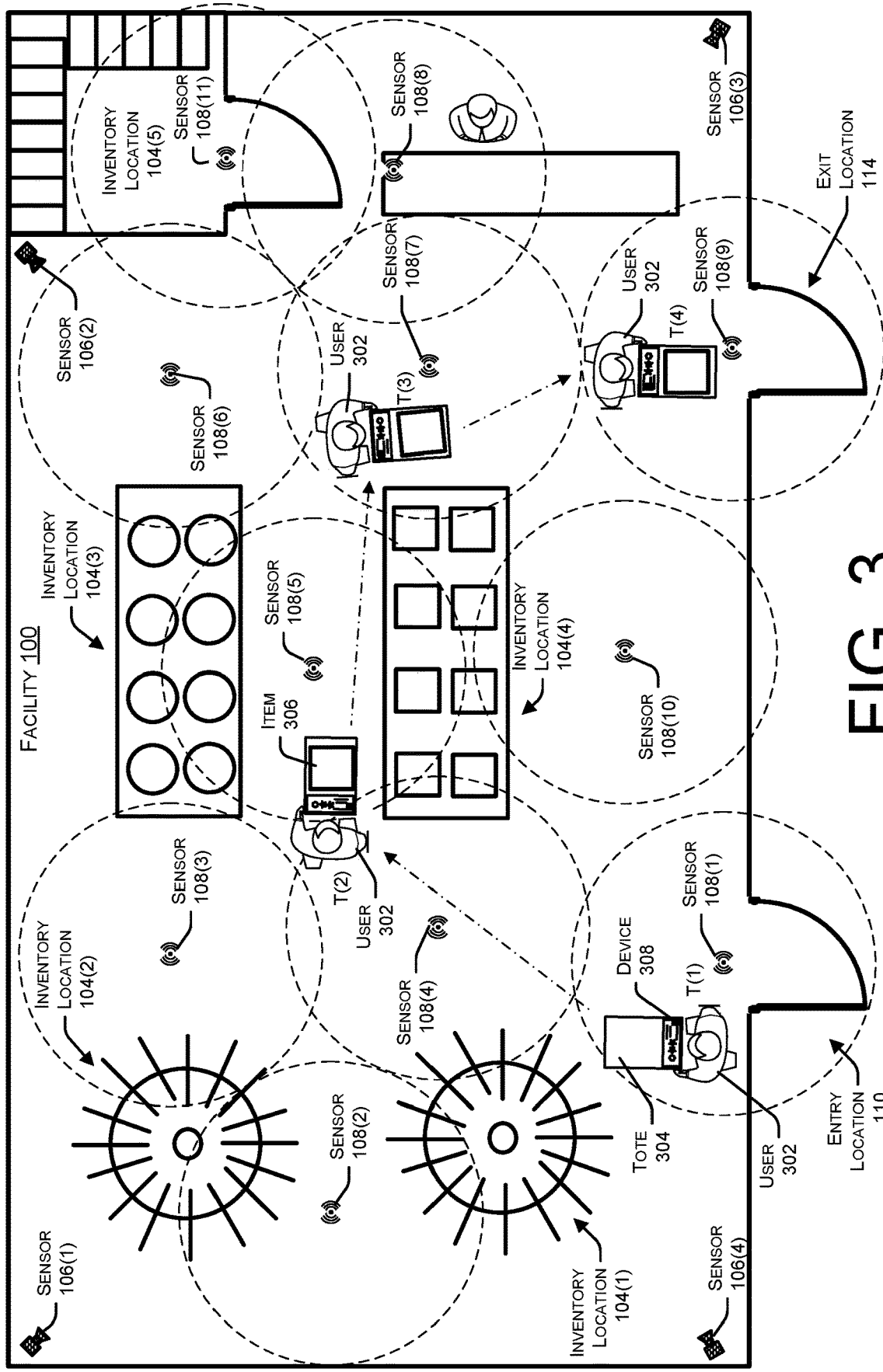
FIG. 3 illustrates the example facility of FIG. 1A. In the example of FIG. 3, a user uses a tote to remove an item from the facility. The system then uses sensor data to determine that the user was in possession of the tote and/or the item when exiting the facility.

FIG. 3 illustrates the example facility of FIG. 1A. In the example of FIG. 3, a user 302 uses a tote 304 to remove an item 306 from the facility 100. The system then uses sensor data to determine that the user 302 was in possession of the item 306 when exiting the facility 100. Similar to items within the facility 100, the tote 304 may include a device 308 that outputs signals received by the second sensors 108. The system then uses the signals to determine the locations of the tote 304.

For instance, the user 302 may enter the facility 100 at a first time ($T_1$). The system may analyze sensor data to determine that the user 302 was located at a first location, the tote 304 was located at a second location, and the item 306 was located at a third location at the first time $T_1$. The system may then determine that the tote 304 was located proximate to the user 302 at the first time $T_1$. As such, the system may determine that there is a first probability (e.g., 50%) that the user 302 was in possession of the tote 304 at the first time $T_1$. The system may also determine that the item 306 was not located proximate to the user 302 and/or the tote 304 at the first time $T_1$. As such, the system may determine that there is a second probability (e.g., 0%) that the user 302 and/or the tote 304 were in possession of the item 306 at the first time $T_1$.

The user 302 may then remove the item 306 from the inventory location 104(4) and place the item 306 in the tote 304 at a second time ($T_2$). Additionally, the system may analyze sensor data to determine that the user 302 was located at a fourth location, the tote 304 was located at a fifth location, and the item 306 was located at a sixth location at the second time $T_2$. The system may then determine that the tote 304 was located proximate to the user 302 at the second time $T_2$. As such, the system may determine that there is a third probability (e.g., 65%) that the user 302 was in possession of the tote 304 at the second time $T_2$. The system may also determine that the item 306 was located proximate to the user 302 and/or the tote 304 at the second time $T_2$. As such, the system may determine that there is a fourth probability (e.g., 50%) that the user 302 and/or the tote 304 were in possession of the item 306 at the second time $T_2$.

Next, the user 302 may move to a different location within the facility 100 at a third time ($T_3$). Additionally, the system may analyze sensor data to determine that the user 302 was located at a seventh location, the tote 304 was located at an eighth location, and the item 306 was located at a ninth location at the third time $T_3$. The system may then determine that the tote 304 was located proximate to the user 302 at the third time $T_3$. As such, the system may determine that there is a fifth probability (e.g., 80%) that the user 302 was in possession of the tote 304 at the third time $T_3$. The system may also determine that the item 306 was located proximate to the user 302 and/or the tote 304 at the third time $T_3$. As such, the system may determine that there is a sixth probability (e.g., 70%) that the user 302 and/or the tote 304 were in possession of the item 306 at the third time $T_3$.

Finally, the user 302 may exit the facility 100 at a fourth time ($T_4$). The system may analyze sensor data to determine that the user 302 was located at a tenth location, the tote 304 was located at an eleventh location, and the item 306 was located at a twelfth location at the fourth time $T_4$. The system may then determine that the tote 304 was located proximate to the user 302 at the fourth time $T_4$. As such, the system may determine that there is a seventh probability (e.g., 99.9%) that the user 302 was in possession of the tote 304 at the fourth time $T_4$. The system may also determine that the item 306 was located proximate to the user 302 and/or the tote 304 at the fourth time $T_4$. As such, the system may determine that there is an eighth probability (e.g., 99.9%) that the user 302 and/or the tote 304 were in possession of the item 306 at the fourth time $T_4$.

In some instances, the system may determine that the user 302 was in possession of the item 306 when exiting the facility 100 based on determining that the user 302 was in possession of the tote 304 and also determining that the item 306 was located within the tote 304. The system may determine that the user 302 was in possession of the tote 304 based on determining that the seventh probability satisfies a threshold probability. Also, the system may determine that the item 306 was located within the tote 304 based on determining that the eighth probability satisfies the threshold probability.

Figure 4:
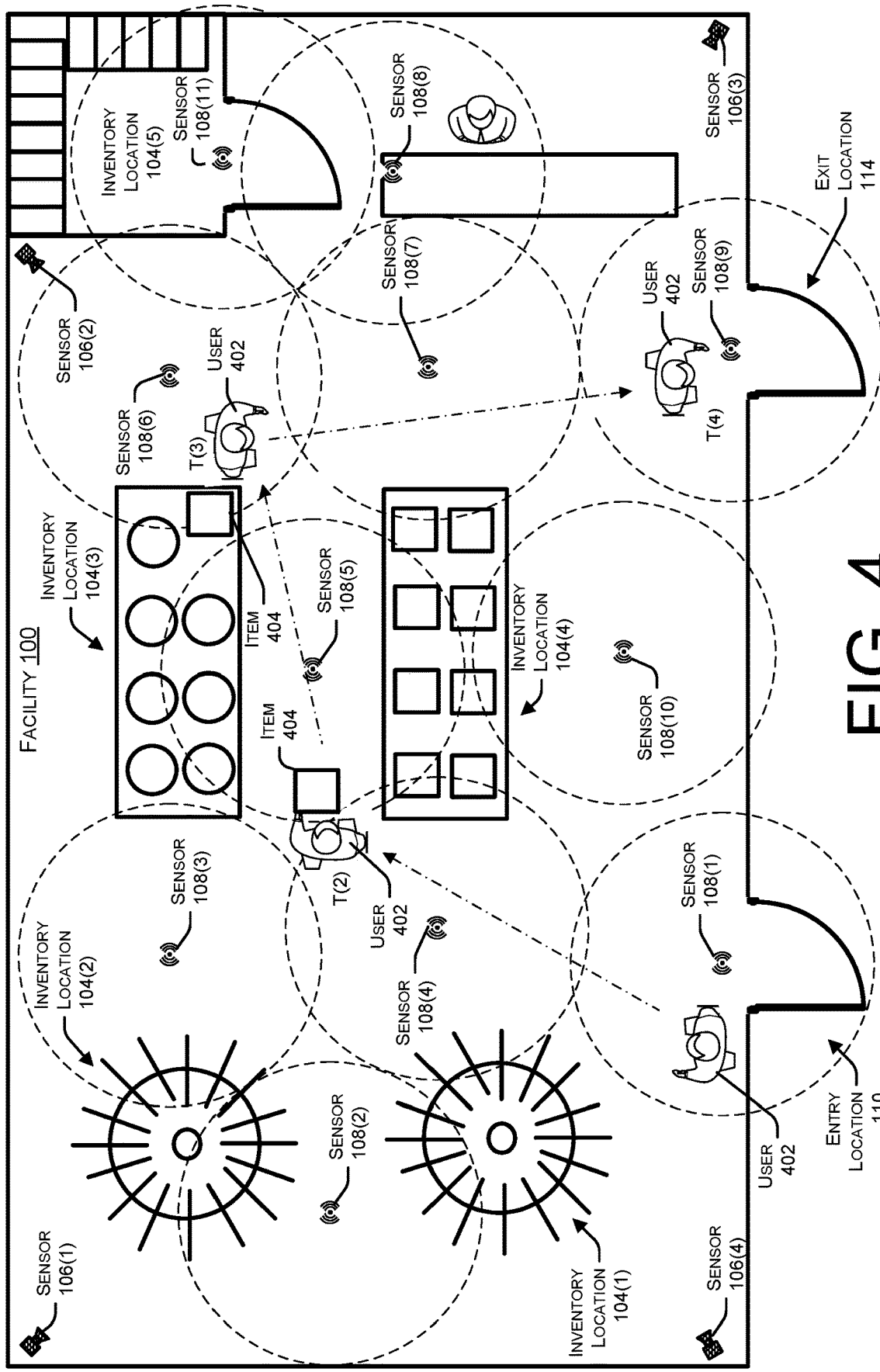
FIG. 4 illustrates an example of the facility of FIG. 1A. In the example of FIG. 4, a user initially removes an item from a first inventory location. The user then returns the item to a second inventory location. As such, the system is able to determine that the user was not in possession of the item when exiting the facility.

FIG. 4 illustrates an example of the facility 100 of FIG. 1A. In the example of FIG. 4, a user 402 initially removes an item 404 from the inventory location 104(4). The user 402 then returns the item 404 to a different inventory location 104(3). As such, the system is able to determine that the user 402 is no longer in possession of the item 404.

For instance, the user 402 may enter the facility 100 at a first time ($T_1$). The system may analyze sensor data to determine that the user 402 was located at a first location and the item 404 was located at a second location at the first time $T_1$. The system may then determine that the item 404 was not located proximate to the user 402 at the first time $T_1$. As such, the system may determine that there is a first probability (e.g., 0%) that the user 402 was in possession of the item 404 at the first time $T_1$.

The user 404 may then remove the item 404 from the inventory location 104(4) at a second time ($T_2$). Additionally, the system may analyze sensor data to determine that the user 402 was located at a third location and the item 404 was located at a fourth location at the second time $T_2$. The system may then determine that the item 404 was located proximate to the user 402 at the second time $T_2$. As such, the system may determine that there is a second probability (e.g., 50%) that the user 402 was in possession of the item 404 at the second time $T_2$.

Next, the user 402 may place the item 404 at the third inventory location 104(3) at a third time ($T_3$). Additionally, the system may analyze sensor data to determine that the user 402 was located at a fifth location and the item 404 was located at a sixth location at the third time $T_3$. The system may then determine that the item 404 was located proximate to the user 402 at the third time $T_3$. As such, the system may determine that there is a third probability (e.g., 70%) that the user 402 was in possession of the item 404 at the third time $T_3$.

Finally, the user 402 may exit the facility 100 at a fourth time ($T_4$). The system may analyze sensor data to determine that the user 402 was located at a seventh location and the item 404 was still located at the sixth location at the fourth time $T_4$. The system may then determine that the item 404 was not located proximate to the user 402 at the fourth time $T_4$ when the user 402 was exiting the facility 100. As such, the system may determine that there is a fourth probability (e.g., 1%) that the user 402 was in possession of the item 404 at the fourth time $T_4$.

In some instances, the system may further determine that the item 404 has been stationary for a threshold period of time. As such, the system may determine that no user is in possession of the item 404 and/or that an event associated with the item 404 has ended. Additionally, the system may determine that the item 404 is not located at the correct inventory location 104(4). In some instances, the system may then notify one or more associates of the facility 100 that the item 404 is not located at the correct inventory location 104(4) so that the one or more associates may move the item 404 back to the inventory location 104(4).

Figure 5:
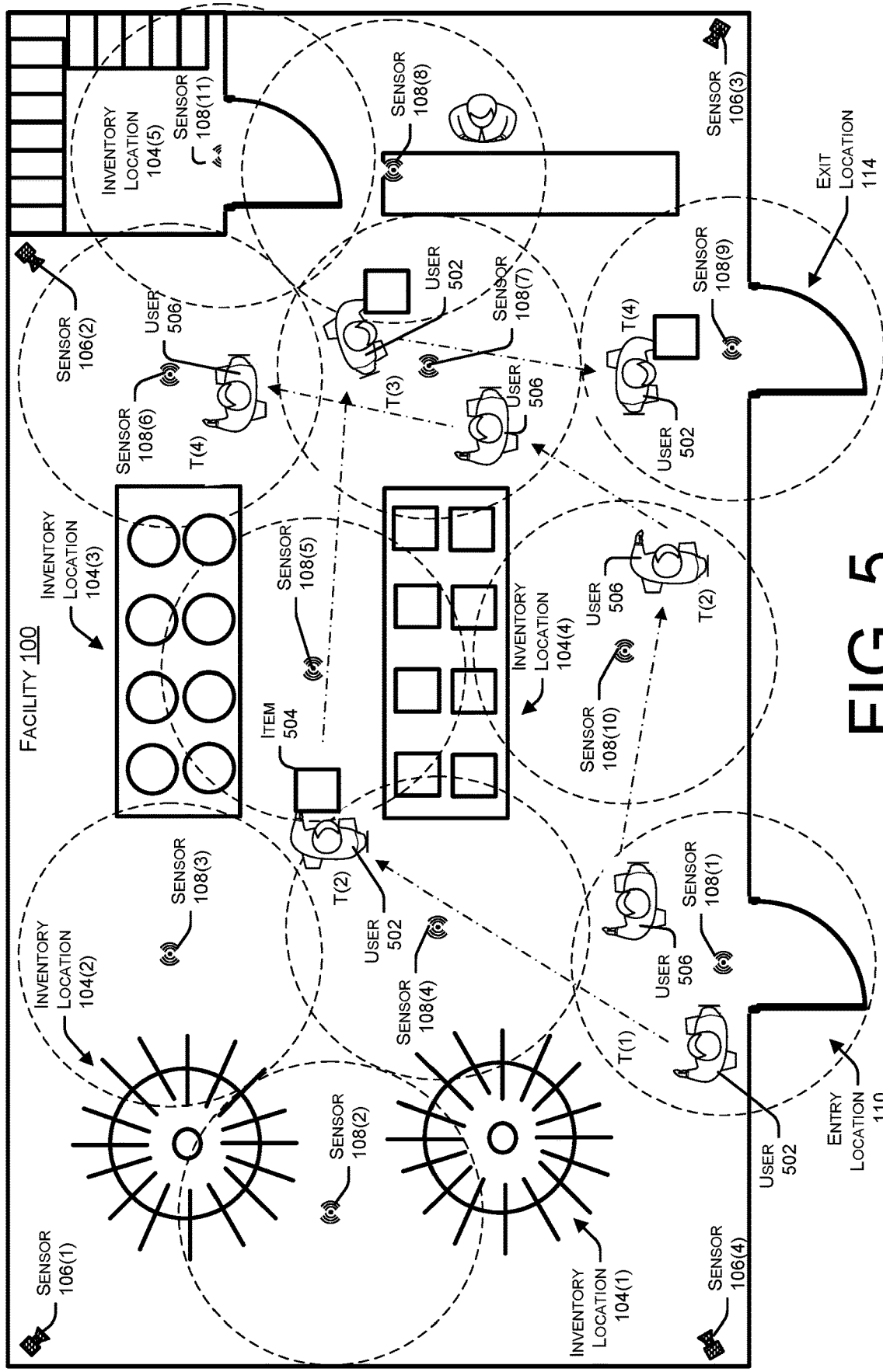
FIG. 5 illustrates an example of the facility of FIG. 1A. In the example of FIG. 5, a first user may remove an item from an inventory location and exit the facility with the item. Additionally, a second user may be navigating through the facility at the same time as the first user. The system may be able to determine that it was the first user that exited the facility with the item.

FIG. 5 illustrates an example of the facility of FIG. 1A. In the example of FIG. 5, a first user 502 may remove an item 504 from the inventory location 104(4) and exit the facility 100 with the item 504. Additionally, a second user 506 may be navigating through the facility 100 at the same time as the first user 502.

For instance, the first user 502 and the second user 506 may enter the facility 100 at a first time ($T_1$). The system may analyze sensor data to determine that the first user 502 was located at a first location, the second user 506 was located at a second location, and the item 504 was located at a third location at the first time $T_1$. The system may then determine that the item 504 was not located proximate to the first user 502 at the first time $T_1$. As such, the system may determine that there is a first probability (e.g., 0%) that the first user 502 was in possession of the item 504 at the first time $T_1$. The system may also determine that the item 504 was not located proximate to the second user 506 at the first time $T_1$. As such, the system may determine that there is a second probability (e.g., 0%) that the second user 506 was in possession of the item 504 at the first time $T_1$.

The first user 502 may then remove the item 504 from the inventory location 104(4) and the second user 506 may move to a different location within the facility 100 at the second time ($T_2$). Additionally, the system may analyze sensor data to determine that the first user 502 was located at a fourth location, the second user 506 was located at a fifth location, and the item 504 was located at a sixth location at the second time $T_2$. The system may then determine that the item 504 was located proximate to the first user 502 at the second time $T_2$. As such, the system may determine that there is a third probability (e.g., 50%) that the first user 502 was in possession of the item 504 at the second time $T_2$. The system may also determine that the item 504 was not located proximate to the second user 506 at the second time $T_2$. As such, the system may determine that there is a fourth probability (e.g., 0%) that the second user 506 was in possession of the item 504 at the second time $T_2$.

Next, the first user 502 and the second user 506 may move to different locations within the facility 100 at a third time ($T_3$). Additionally, the system may analyze sensor data to determine that the first user 502 was located at a seventh location, the second user 506 was located at an eighth location, and the item 504 was located at a ninth location at the third time $T_3$. The system may then determine that the item 504 was located proximate to the first user 502 at the third time $T_3$. As such, the system may determine that there is a fifth probability (e.g., 70%) that the first user 502 was in possession of the item 504 at the third time $T_3$. The system may also determine that the item 204 was located proximate to the second user 506 at the third time $T_3$. As such, the system may determine that there is a sixth probability (e.g., 50%) that the second user 506 was in possession of the item 504 at the third time $T_3$.

Finally, the first user 502 may exit the facility 100 while the second user 506 moves to a different location within the facility 100 at a fourth time ($T_4$). The system may analyze sensor data to determine that the first user 502 was located at a tenth location, the second user 506 was located at an eleventh location, and the item 504 was located at a twelfth location at the fourth time $T_4$. The system may then determine that the item 504 was located proximate to the first user 502 at the fourth time $T_4$. As such, the system may determine that there is a seventh probability (e.g., 99.9%) that the first user 502 was in possession of the item 504 at the fourth time $T_4$. The system may also determine that the item 504 was not located proximate to the second user 506 at the fourth time $T_4$. As such, the system may determine that there is an eighth probability (e.g., 1%) that the second user 506 was in possession of the item 504 at the fourth time $T_4$.

FIG. 6 illustrates an example of the type of information that may be included in timestamps for an item. As shown, timestamp data 602 may represent at least a sensor identifier, a device identifier, a zone, an X-location, a Y-location, a Z-location, a time, and a received signal strength identifier (RSSI). The sensor identifier may identify the sensor that detected the device. Additionally, the device identifier may identify the device that output the signal detected by the sensor. As described herein, an identifier (e.g., the sensor identifier, the device identifier, the user identifier, etc.) may include, but is not limited to, a numerical identifier, an alphabetic identifier, a mixed numerical and alphabetic identifier, and/or any other type of identifier that may be used to identify a device and/or user.

The zone may indicate which zone of the facility the sensor is located within that detected the signal. The X-location, Y-location, and Z-location may represent the coordinates within the facility at which the device was located. The time may indicate the times at which the sensors received the signals from the device. Additionally, the RSSI may indicate the RSSI of the signals received by the sensors and from the device. Finally, the confidence may indicate a confidence level that the sensors actually received from the signals from the device. For instance, a higher confidence may indicate a greater likelihood that the sensors did receive a signal from the device.

While this is just one example of the type of information that may be stored, in other examples, the timestamp data 602 may not include at least some of the information. Additionally, or alternatively, in some examples, the timestamp data 602 may represent additional information not illustrated in the example of FIG. 6.

FIGS. 7A-9 illustrate various processes for implementing AC techniques for customers of facilities. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 7A:
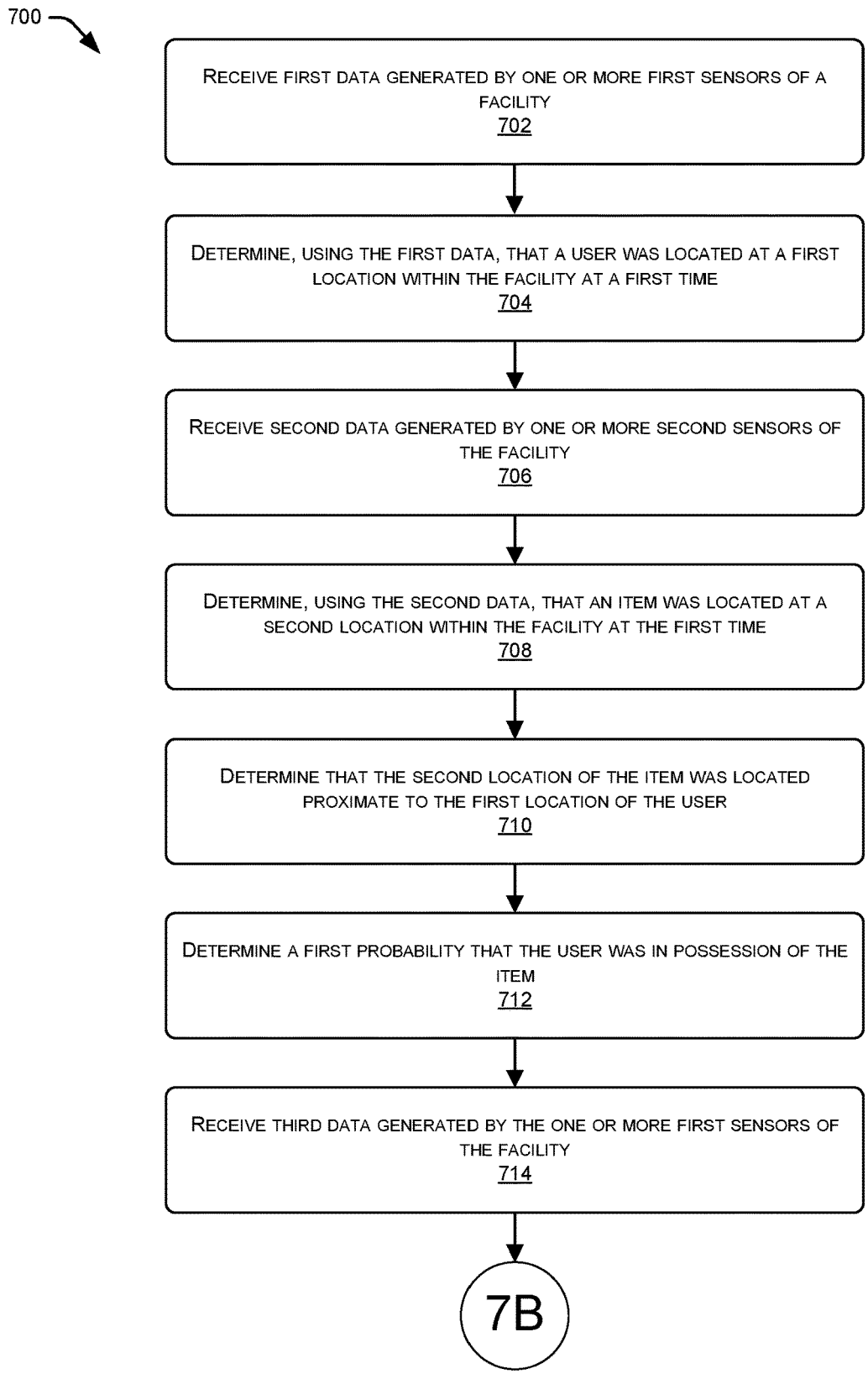
FIGS. 7A-7B are an example process for using locations of a user and locations of an item to determine that the user was in possession of the item when exiting a facility.
Figure 7B:
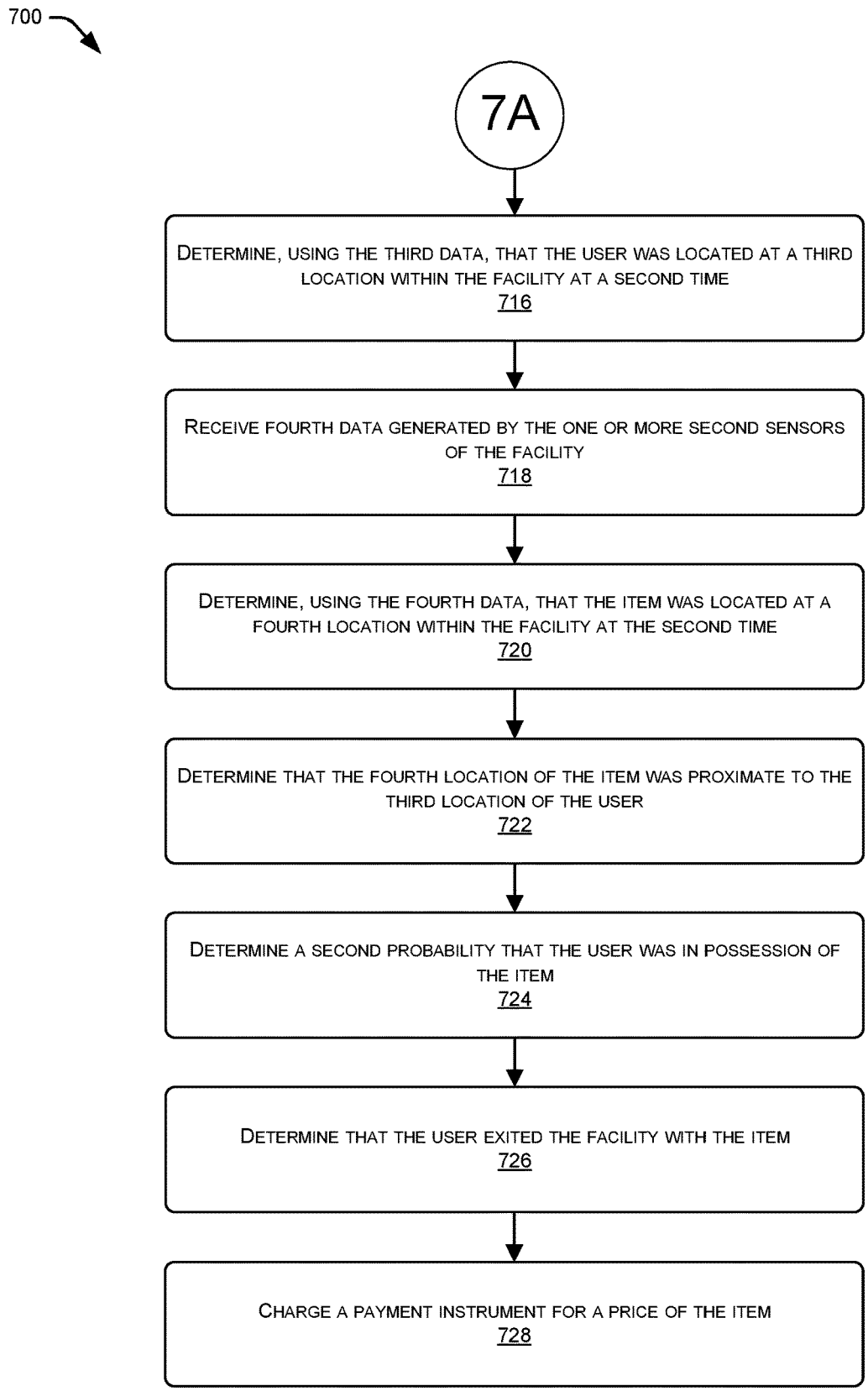

FIGS. 7A-7B are an example process 700 for using locations of a user and locations of an item to determine that the user was in possession of the item when exiting a facility. At 702, the process 700 may include receiving first data generated by one or more first sensors of a facility and at 704, the process 700 may include determining, using the first data, that a user was located at a first location within a facility at a first time. For instance, the system may receive the first data from the one or more first sensors. In some instances, the first data is image data generated by a first camera. The system may then analyze the first data to determine that the user was located at the first location at the first time. In some instances, the system may generate timestamp data representing at least the first time that the user was located at the first location.

At 706, the process 700 may include receiving second data generated by one or more second sensors of the facility and at 708, the process 700 may include determining, using the second data, that an item was located at a second location within the facility at the first time. For instance, the system may receive the second data from the one or more second sensors. In some instances, the second data is generated by a first reader. The system may then analyze the second data to determine that the item was located at the second location at the second time. In some instances, the system may generate timestamp data representing at least the second time that the item was located at the second location.

At 710, the process 700 may include determining that the second location of the item was located proximate to the first location of the user. For instance, the system may determine that the second location of the item was located proximate to the first location of the user. In some instances, the system makes the determination by determining that the second location of the item was within a threshold distance to the first location of the user. In some instances, the system makes the determination using the generated timestamps.

At 712, the process 700 may include determining a first probability that the user was in possession of the item. For instance, the system may determine the first probability based on the item being located proximate to the user at the first time. In some instances, if the system has yet to generate a previous probability that associates the user with the item, then the system may determine that the first probability includes a given probability. In some instances, if the system has already generated a previous probability that associates the user with the item, then the system may determine the first probability by increasing the previous probability.

At 714, the process 700 may include receiving third data generated by the one or more first sensors of the facility and at 716, the process 700 may include determining, using the third data, that the user was located at a third location within the facility at the first time. For instance, the system may receive the third data from the one or more first sensors. In some instances, the third data is image data generated by a second camera. The system may then analyze the third data to determine that the user was located at the third location at the second time. In some instances, the system may generate timestamp data representing at least the second time that the user was located at the third location.

At 718, the process 700 may include receiving fourth data generated by the one or more second sensors of the facility and at 720, the process 700 may include determining, using the fourth data, that the item was located at a fourth location within the facility at the second time. For instance, the system may receive the fourth data from the one or more second sensors. In some instances, the fourth data is generated by a second reader. The system may then analyze the fourth data to determine that the item was located at the fourth location at the second time. In some instances, the system may generate timestamp data representing at least the second time that the item was located at the fourth location.

At 722, the process 700 may include determining that the fourth location of the item was located proximate to the third location of the user. For instance, the system may determine that the fourth location of the item was located proximate to the third location of the user. In some instances, the system makes the determination by determining that the fourth location of the item was within a threshold distance to the third location of the user. In some instances, the system makes the determination using the generated timestamps.

At 724, the process 700 may include determining a second probability that the user was in possession of the item and at 726, the process 700 may include determining that the user exited the facility with the item. For instance, the system may determine the second probability based on the item being located proximate to the user at the second time. In some instances, the system may determine the second probability by increasing the first probability. The system may then determine that user exited the facility with the item based on the second probability. In some instances, the system makes the determination based on the second probability satisfying a threshold probability.

At 728, the process 700 may include charging a payment instrument for a price of the item. For instance, the system may use an identifier associated with the user to identify an account of the user. Based on the user exiting the facility with the item, the system may store data that associates an identifier of the item with the account. Additionally, the system may charge a payment instrument for the price of the item. In some instances, the system charges the payment instrument using payment information that is stored in association with the account.

Figure 8:
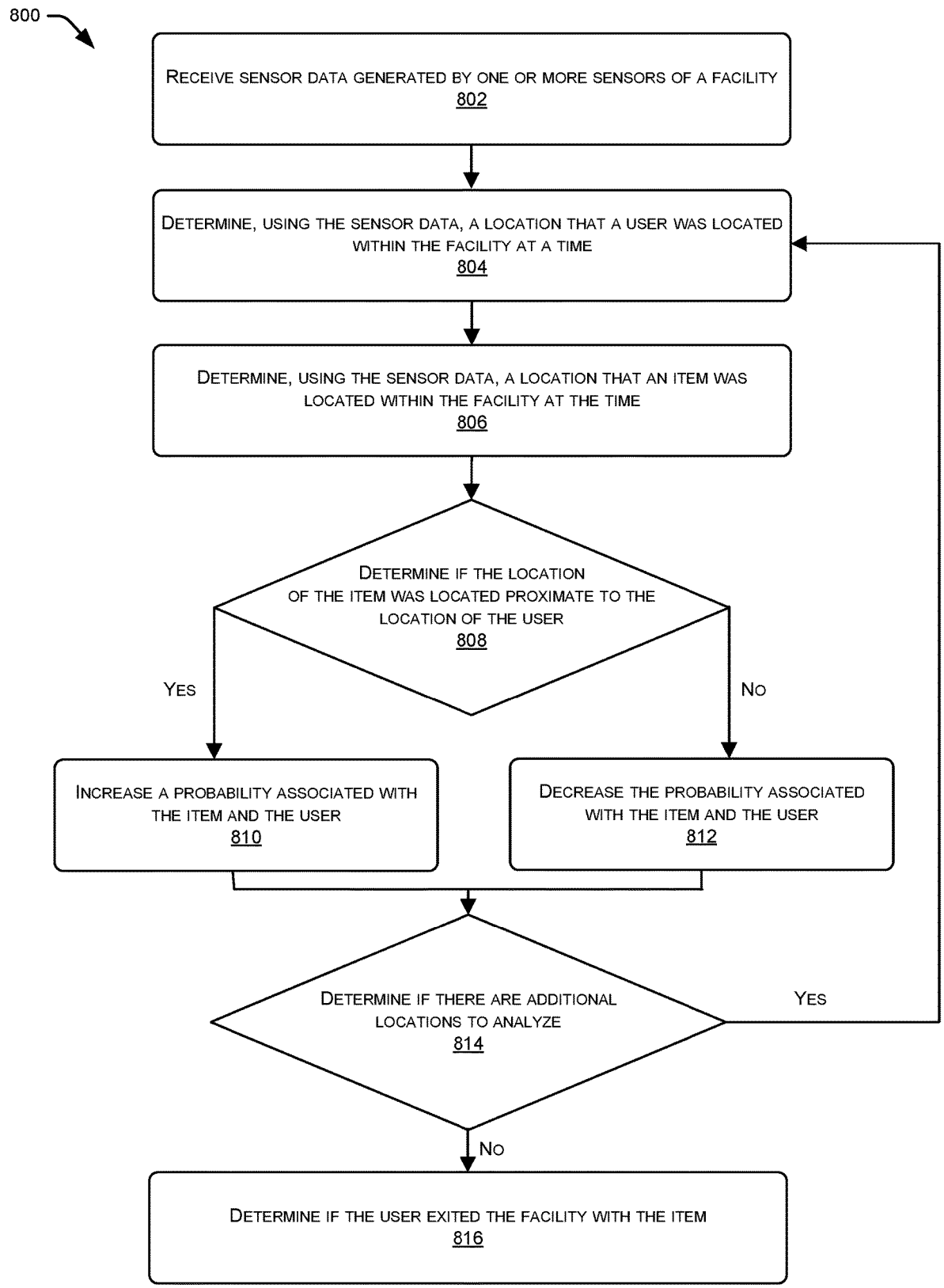
FIG. 8 is a first example process for determining whether a user was in possession of an item.

FIG. 8 is a first example process 800 for determining whether a user is in possession of an item. At 802, the process 800 may include receiving sensor data generated by one or more sensors of a facility. For instance, the system may receive the sensor data generated by the one or more sensors. In some instances, the one or more sensors may include cameras, signal readers, weight sensors, and/or any other type of sensor that is capable of generating the sensor data. The one or more sensors may be located at various locations within the facility. For example, the one or more sensors may be located at the entrance, the exit, the inventory locations, and/or the like of the facility.

At 804, the process 800 may include determining, using the sensor data, a location that a user was located within the facility at a time and at 806, the process 800 may include determining, using the sensor data, a location that an item was located within the facility at the time. For instance, the system may analyze the sensor data to determine the location of the user and the location of the item at the time. In some instances, the system determines the location of the user and/or the location of the item while the user is still located within the facility. In some instances, the system determines the location of the user and/or the location of the item after the user exits the facility.

At 808, the process 800 may include determining if the location of the item was located proximate to the location of the user. For example, the system may determine if the item was located proximate to the user at the time. In some instances, the system may determine that the item was located proximate to the user when the item was located within a threshold distance to the user at the time. In some instances, the system may determine that the item was located proximate to the user when the same sensor detected both the item and the user at the time.

If, at 808, it is determined that the location of the item was located proximate to the location of the user, then at 810, the process 800 may include increasing a probability associated with the item and the user. For instance, if the system determines that the item was located proximate to the user, then the system may increase the probability that the user was in possession of the item while within the facility and/or when exiting the facility. In some instances, the system may utilize a weight when increasing the probability. For example, if the location of the user is proximate to the exit of the facility, then the system may provide more weight (e.g., increase the probability by a greater amount) than if the location of the user was not proximate to the exit of the facility.

However, if, at 808, it is determined that the location of the item was not located proximate to the location of the user, then at 812, the process 800 may include decreasing the probability associated with the item and the user. For instance, if the system determines that the item was not located proximate to the user, then the system may decrease the probability that the user was in possession of the item while within the facility and/or when exiting the facility. In some instances, the system may utilize a weight when decreasing the probability. For example, if the location of the user is proximate to the exit of the facility, then the system may provide more weight (e.g., decrease the probability by a greater amount) than if the location of the user was not proximate to the exit of the facility.

At 814, the process 800 may determine if there are additional locations to analyze. For example, the system may determine whether there is data indicating that the user and/or the item were located at additional locations within the facility. If, at 814, it is determined that there are additional locations to analyze, then the process 800 may repeat back at 804. For instance, if the system determines that there are additional locations to analyze, then the system may perform 804-812 to continue to update the probability.

However, if, at 814, it is determined that there are not additional locations to analyze, then at 816, the process 800 may include determining if the user exited the facility with the item. For instance, if the system determines that there are no additional locations to analyze, then the system may determine if the user exited the facility with the item. In some instances, the system may determine that the user did not exit the facility with the item when the probability does not satisfy a threshold probability. Additionally, the system may determine that the user exited the facility with the item when the probability satisfies the threshold probability. The system may then store data that associates an identifier of the item with an account associated with the user.

Figure 9:
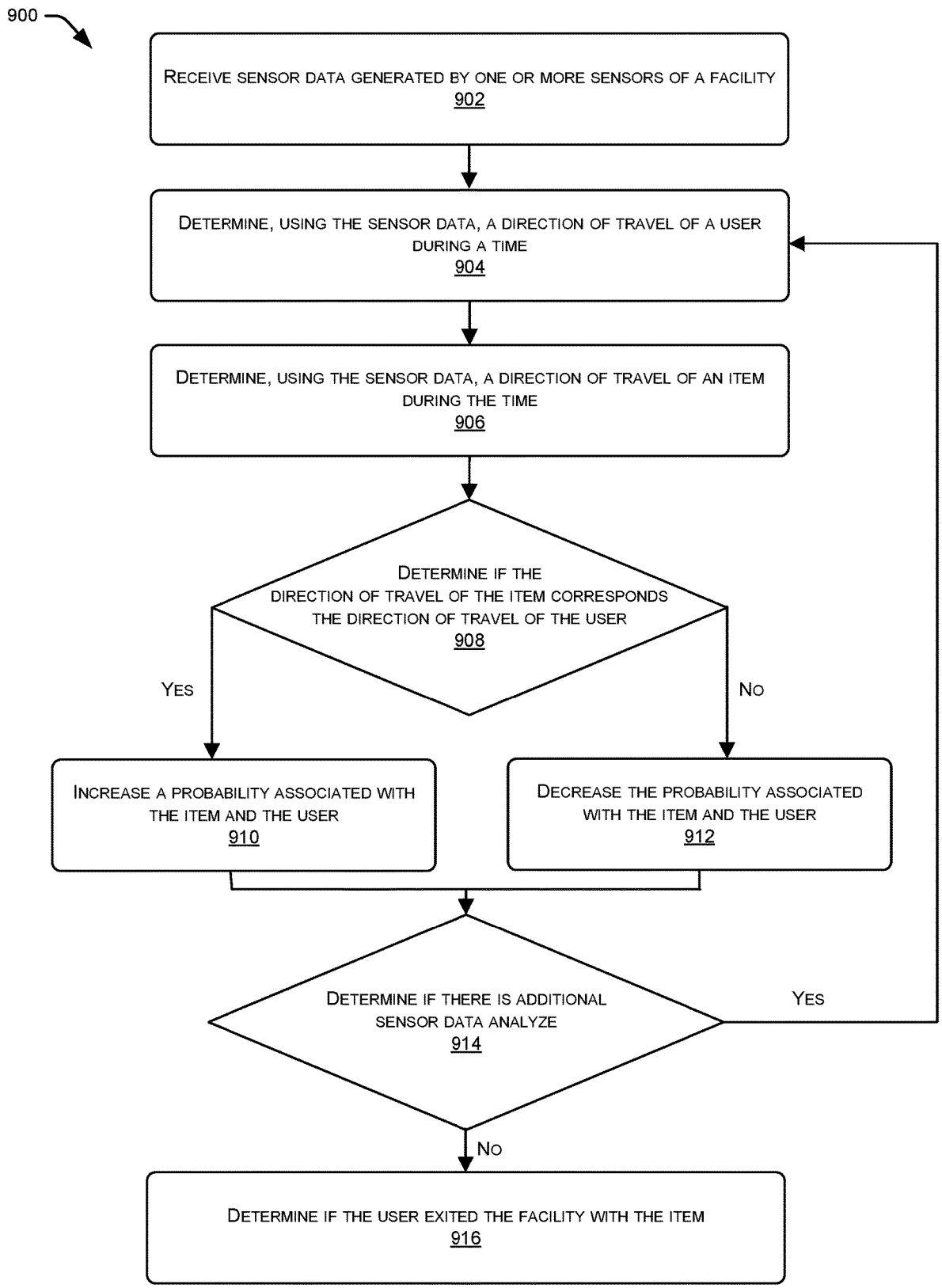
FIG. 9 is a second example process for determining whether a user was in possession of an item.

FIG. 9 is a second example process 900 for determining whether a user is in possession of an item. At 902, the process 900 may include receiving sensor data generated by one or more sensors of a facility. For instance, the system may receive the sensor data generated by the one or more sensors. In some instances, the one or more sensors may include cameras, signal readers, weight sensors, and/or any other type of sensor that is capable of generating the sensor data. The one or more sensors may be located at various locations within the facility. For example, the one or more sensors may be located at the entrance, the exit, the inventory locations, and/or the like of the facility.

At 904, the process 900 may include determining, using the sensor data, a direction of travel of a user during a time and at 906, the process 900 may include determining, using the sensor data, a direction of travel of an item during the time. For instance, the system may analyze the sensor data to determine the direction of travel of the user and the direction of travel of the item during the time. In some instances, the system determines the direction of travel of the user and/or the direction of travel of the item while the user is still located within the facility. In some instances, the system determines the direction of travel of the user and/or the direction of travel of the item after the user exits the facility.

At 908, the process 900 may include determining if the direction of travel of the item corresponds to the direction of travel of the user. For example, the system may determine if the direction of travel of the item corresponds to the direction of travel of the user. In some instances, the system may determine that the direction of travel of the item corresponds to the direction of travel of the user based on a direction of the item being approximately equal to a direction of the user and/or a distance traveled by the user being approximately equal to a distance traveled by the item.

If, at 908, it is determined that the direction of travel of the item corresponds to the direction of travel of the user, then at 910, the process 900 may include increasing a probability associated with the item and the user. For instance, if the system determines that the direction of travel of the item corresponds to the direction of travel of the user, then the system may increase the probability that the user was in possession of the item while within the facility and/or when exiting the facility. In some instances, the system may utilize a weight when increasing the probability. For example, if the determination is made when the user is proximate to the exit of the facility, then the system may provide more weight (e.g., increase the probability by a greater amount) than if the determination was made when the user was not proximate to the exit of the facility.

However, if, at 908, it is determined that direction of travel of the item does not correspond to the direction of travel of the user, then at 912, the process 900 may include decreasing the probability associated with the item and the user. For instance, if the system determines that the direction of travel of the item does not correspond to the direction of travel of the user, then the system may decrease the probability that the user was in possession of the item while within the facility and/or when exiting the facility. In some instances, the system may utilize a weight when decreasing the probability.

At 914, the process 900 may determine if there are additional sensor data to analyze. For example, the system may determine whether there is additional sensor data representing the user and/or the item within the facility. If, at 914, it is determined that there are additional sensor data to analyze, then the process 9800 may repeat back at 904. For instance, if the system determines that there are additional sensor data to analyze, then the system may perform 904-912 to continue to update the probability.

However, if, at 914, it is determined that there are not additional sensor data to analyze, then at 916, the process 900 may include determining if the user exited the facility with the item. For instance, if the system determines that there are no additional sensor data to analyze, then the system may determine if the user exited the facility with the item. In some instances, the system may determine that the user did not exit the facility with the item when the probability does not satisfy a threshold probability. Additionally, the system may determine that the user exited the facility with the item when the probability satisfies the threshold probability. The system may then store data that associates an identifier of the item with an account associated with the user.

Figure 10:
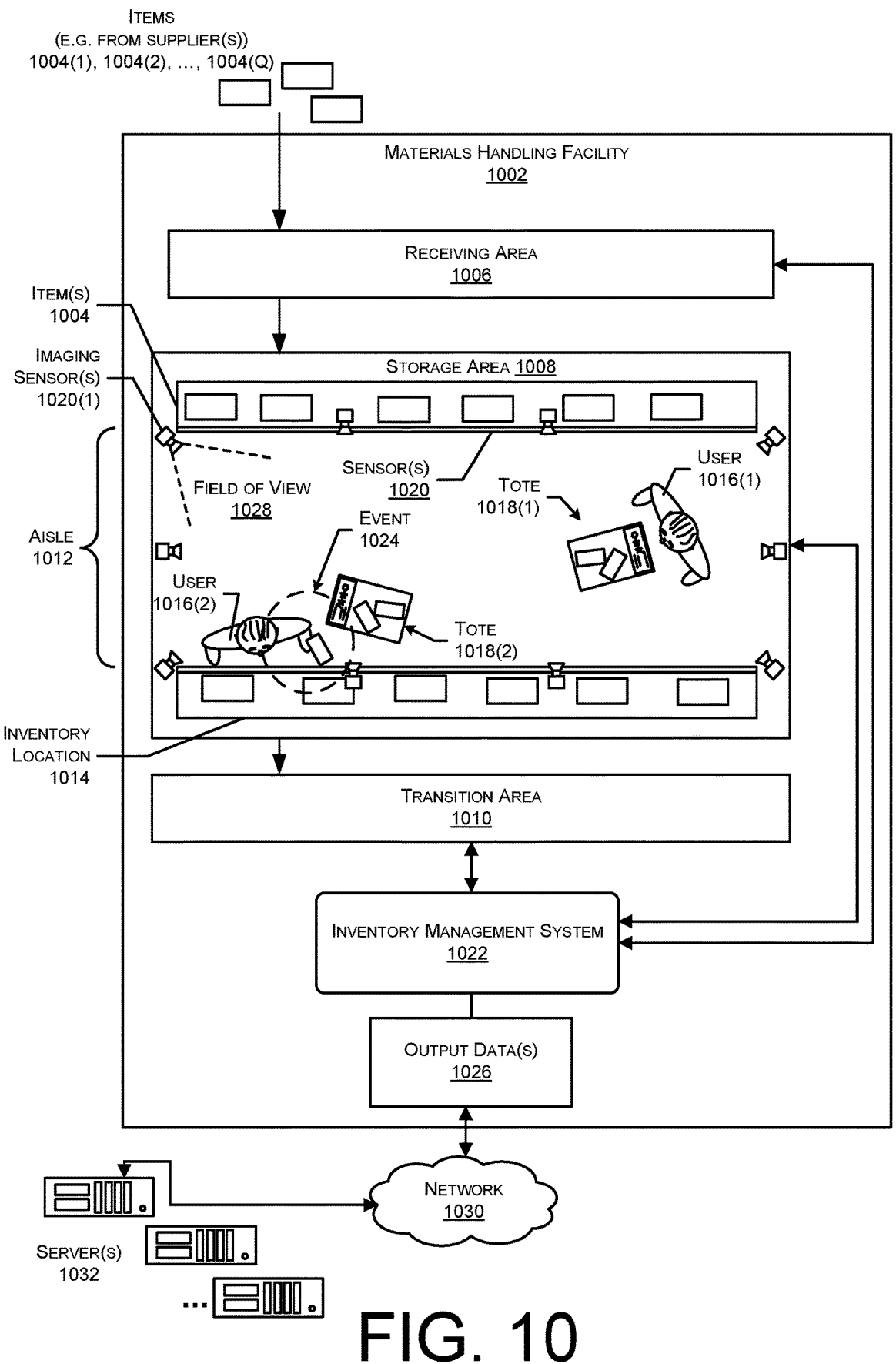
FIG. 10 is a block diagram of an example materials handling facility that includes sensors and an inventory management system configured to generate output regarding events occurring in the facility using the sensor data.
Figure 11:
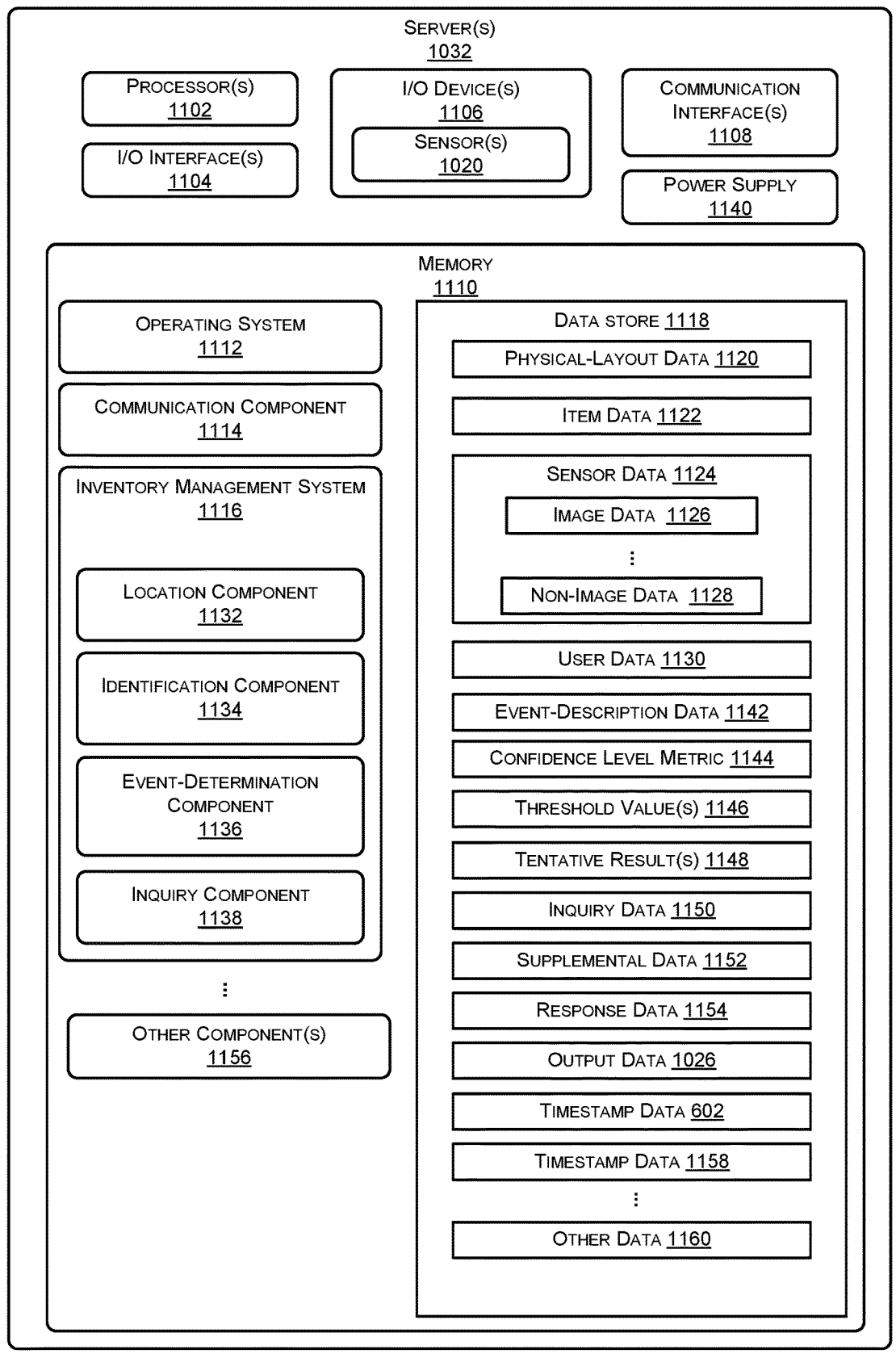
FIG. 11 illustrates a block diagram of one or more servers configured to support operation of the facility. As illustrated, the servers may include a checkout-eligibility component for determining whether a user is eligible to exit the facility with one or more picked items without performing a manual checkout of the items.

FIGS. 10 and 11 represent an illustrative materials handling environment, such as the materials handling facility 1002, in which the techniques described herein may be applied to cameras monitoring the environments as described below. However, the following description is merely one illustrative example of an industry and environment in which the techniques described herein may be utilized. The materials handling facility 1002 (or "facility") comprises one or more physical structures or areas within which one or more items 1004(1), 1004(2), . . . , 1004(Q) (also referred to as "items 1004") may be held. As used in this disclosure, letters in parentheses such as "(Q)" indicate an integer result. The items 1004 comprise physical goods, such as books, pharmaceuticals, repair parts, electronic gear, groceries, and so forth.

The facility 1002 may include one or more areas designated for different functions with regard to inventory handling. In this illustration, the facility 1002 includes a receiving area 1006, a storage area 1008, and a transition area 1010. The receiving area 1006 may be configured to accept items 1004, such as from suppliers, for intake into the facility 1002. For example, the receiving area 1006 may include a loading dock at which trucks or other freight conveyances unload the items 1004.

The storage area 1008 is configured to store the items 1004. The storage area 1008 may be arranged in various physical configurations. In one implementation, the storage area 1008 may include one or more aisles 1012. The aisle 1012 may be configured with, or defined by, inventory locations 1014 on one or both sides of the aisle 1012. The inventory locations 1014 may include one or more of shelves, racks, cases, cabinets, bins, floor locations, or other suitable storage mechanisms for holding or storing the items 1004. The inventory locations 1014 may be affixed to the floor or another portion of the facility's structure, or may be movable such that the arrangements of aisles 1012 may be reconfigurable. In some implementations, the inventory locations 1014 may be configured to move independently of an outside operator. For example, the inventory locations 1014 may comprise a rack with a power source and a motor, operable by a computing device to allow the rack to move from one location within the facility 1002 to another.

One or more users 1016(1), 1016(2) (also referred to as "users 1016")), totes 1018(1), 1018(2) (also referred to as "totes 1018")) or other material handling apparatus may move within the facility 1002. For example, the users 1016 may move about within the facility 1002 to pick or place the items 1004 in various inventory locations 1014, placing them on the totes 1018 for ease of transport. An individual tote 1018 is configured to carry or otherwise transport one or more items 1004. For example, a tote 1018 may include a basket, a cart, a bag, and so forth. In other implementations, other agencies such as robots, forklifts, cranes, aerial drones, and so forth, may move about the facility 1002 picking, placing, or otherwise moving the items 1004.

One or more sensors 1020 may be configured to acquire information in the facility 1002. The sensors 1020 in the facility 1002 may include sensors fixed in the environment (e.g., ceiling-mounted cameras) or otherwise, such as sensors in the possession of users (e.g., mobile phones, tablets, etc.). The sensors 1020 may include, but are not limited to, cameras 1020(1), weight sensors, radio frequency (RF) receivers, temperature sensors, humidity sensors, vibration sensors, and so forth. The sensors 1020 may be stationary or mobile, relative to the facility 1002. For example, the inventory locations 1014 may contain cameras 1020(1) configured to acquire images of pick or placement of items 1004 on shelves, of the users 1016(1) and 1016(2) in the facility 1002, and so forth. In another example, the floor of the facility 1002 may include weight sensors configured to determine a weight of the users 1016 or another object thereupon.

During operation of the facility 1002, the sensors 1020 may be configured to provide information suitable for tracking how objects move or other occurrences within the facility 1002. For example, a series of images acquired by a camera 1020(1) may indicate removal of an item 1004 from a particular inventory location 1014 by one of the users 1016 and placement of the item 1004 on or at least partially within one of the totes 1018.

While the storage area 1008 is depicted as having one or more aisles 1012, inventory locations 1014 storing the items 1004, sensors 1020, and so forth, it is understood that the receiving area 1006, the transition area 1010, or other areas of the facility 1002 may be similarly equipped. Furthermore, the arrangement of the various areas within the facility 1002 is depicted functionally rather than schematically. For example, multiple different receiving areas 1006, storage areas 1008, and transition areas 1010 may be interspersed rather than segregated in the facility 1002.

The facility 1002 may include, or be coupled to, an inventory management system 1022, which may perform some or all of the techniques described above with reference to FIGS. 1A-8. For example, the inventory management system 1022 may maintain a virtual cart of each user within the facility. The inventory management system 1022 may also store a record associated with each user indicating an identifier associated with the user, the location of the user, and whether the user is eligible to exit the facility with one or more items without performing a manual checkout of the items. The inventory management system 1022 may also generate and output notification data to the users 1016, indicating whether or not they are so eligible.

As illustrated, the inventory management system 1022 may reside at the facility 1002 (e.g., as part of on-premises servers), on the servers 1032 that are remote from the facility 1002, a combination thereof. In each instance, the inventory management system 1022 is configured to identify interactions and events with and between users 1016, devices such as sensors 1020, robots, material handling equipment, computing devices, and so forth, in one or more of the receiving area 1006, the storage area 1008, or the transition area 1010. As described above, some interactions may further indicate the existence of one or more events 1024, or predefined activities of interest. For example, events 1024 may include the entry of the user 1016 to the facility 1002, stocking of items 1004 at an inventory location 1014, picking of an item 1004 from an inventory location 1014, returning of an item 1004 to an inventory location 1014, placement of an item 1004 within a tote 1018, movement of users 1016 relative to one another, gestures by the users 1016, and so forth. Other events 1024 involving users 1016 may include the user 1016 providing authentication information in the facility 1002, using a computing device at the facility 1002 to authenticate identity to the inventory management system 1022, and so forth. Some events 1024 may involve one or more other objects within the facility 1002. For example, the event 1024 may comprise movement within the facility 1002 of an inventory location 1014, such as a counter mounted on wheels. Events 1024 may involve one or more of the sensors 1020. For example, a change in operation of a sensor 1020, such as a sensor failure, change in alignment, and so forth, may be designated as an event 1024. Continuing the example, movement of a camera 1020(1) resulting in a change in the orientation of the field of view 1028 (such as resulting from someone or something bumping the camera 1020(1)) may be designated as an event 1024.

By determining the occurrence of one or more of the events 1024, the inventory management system 1022 may generate output data 1026. The output data 1026 comprises information about the event 1024. For example, where the event 1024 comprises an item 1004 being removed from an inventory location 1014, the output data 1026 may comprise an item identifier indicative of the particular item 1004 that was removed from the inventory location 1014 and a user identifier of a user that removed the item.

The inventory management system 1022 may use one or more automated systems to generate the output data 1026. For example, an artificial neural network, one or more classifiers, or other automated machine learning techniques may be used to process the sensor data from the one or more sensors 1020 to generate output data 1026. For example, the inventory management system 1022 may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 1026 or the tentative results. The automated systems may generate confidence level data that provides information indicative of the accuracy or confidence that the output data 1026 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 1010%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1004, user 1016, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1016 may pick an item 1004(1) such as a perfume bottle that is generally cubical in shape from the inventory location 1014. Other items 1004 at nearby inventory locations 1014 may be predominantly spherical. Based on the difference in shape (cube vs. sphere) from the adjacent items, and the correspondence in shape with the previously stored image of the perfume bottle item 1004(1) (cubical and cubical), the confidence level that the user 102 has picked up the perfume bottle item 1004(1) is high.

In some situations, the automated techniques may be unable to generate output data 1026 with a confidence level above a threshold result. For example, the automated techniques may be unable to distinguish which user 1016 in a crowd of users 1016 has picked up the item 1004 from the inventory location 1014. In other situations, it may be desirable to provide human confirmation of the event 1024 or of the accuracy of the output data 1026. For example, some items 1004 may be deemed age restricted such that they are to be handled only by users 1016 above a minimum age threshold.

In instances where human confirmation is desired, sensor data associated with an event 1024 may be processed to generate inquiry data. The inquiry data may include a subset of the sensor data associated with the event 1024. The inquiry data may also include one or more of one or more tentative results as determined by the automated techniques, or supplemental data. The subset of the sensor data may be determined using information about the one or more sensors 1020. For example, camera data such as the location of the camera 1020(1) within the facility 1002, the orientation of the camera 1020(1), and a field of view 1028 of the camera 1020(1) may be used to determine if a particular location within the facility 1002 is within the field of view 1028. The subset of the sensor data may include images that may show the inventory location 1014 or that the item 1004 was stowed. The subset of the sensor data may also omit images from other cameras 1020(1) that did not have that inventory location 1014 in the field of view 1028. The field of view 1028 may comprise a portion of the scene in the facility 1002 that the sensor 1020 is able to generate sensor data about.

Continuing the example, the subset of the sensor data may comprise a video clip acquired by one or more cameras 1020(1) having a field of view 1028 that includes the item 1004. The tentative results may comprise the "best guess" as to which items 1004 may have been involved in the event 1024. For example, the tentative results may comprise results determined by the automated system that have a confidence level above a minimum threshold.

The facility 1002 may be configured to receive different kinds of items 1004 from various suppliers and to store them until a customer orders or retrieves one or more of the items 1004. A general flow of items 1004 through the facility 1002 is indicated by the arrows of FIG. 10. Specifically, as illustrated in this example, items 1004 may be received from one or more suppliers, such as manufacturers, distributors, wholesalers, and so forth, at the receiving area 1006. In various implementations, the items 1004 may include merchandise, commodities, perishables, or any suitable type of item 1004, depending on the nature of the enterprise that operates the facility 1002. The receiving of the items 1004 may comprise one or more events 1024 for which the inventory management system 1022 may generate output data 1026.

Upon being received from a supplier at receiving area 1006, the items 1004 may be prepared for storage. For example, items 1004 may be unpacked or otherwise rearranged. The inventory management system 1022 may include one or more software applications executing on a computer system to provide inventory management functions based on the events 1024 associated with the unpacking or rearrangement. These inventory management functions may include maintaining information indicative of the type, quantity, condition, cost, location, weight, or any other suitable parameters with respect to the items 1004. The items 1004 may be stocked, managed, or dispensed in terms of countable, individual units or multiples, such as packages, cartons, crates, pallets, or other suitable aggregations. Alternatively, some items 1004, such as bulk products, commodities, and so forth, may be stored in continuous or arbitrarily divisible amounts that may not be inherently organized into countable units. Such items 1004 may be managed in terms of measurable quantity such as units of length, area, volume, weight, time, duration, or other dimensional properties characterized by units of measurement. Generally speaking, a quantity of an item 1004 may refer to either a countable number of individual or aggregate units of an item 1004 or a measurable amount of an item 1004, as appropriate.

After arriving through the receiving area 1006, items 1004 may be stored within the storage area 1008. In some implementations, like items 1004 may be stored or displayed together in the inventory locations 1014 such as in bins, on shelves, hanging from pegboards, and so forth. In this implementation, all items 1004 of a given kind are stored in one inventory location 1014. In other implementations, like items 1004 may be stored in different inventory locations 1014. For example, to optimize retrieval of certain items 1004 having frequent turnover within a large physical facility 1002, those items 1004 may be stored in several different inventory locations 1014 to reduce congestion that might occur at a single inventory location 1014. Storage of the items 1004 and their respective inventory locations 1014 may comprise one or more events 1024. In some instances, device(s) may be placed on one or more of the items 1004, where the devise(s) are used to track the one or more items 1004 while within the facility 1002, as described herein.

When a customer order specifying one or more items 1004 is received, or as a user 1016 progresses through the facility 1002, the corresponding items 1004 may be selected or "picked" from the inventory locations 1014 containing those items 1004. In various implementations, item picking may range from manual to completely automated picking. For example, in one implementation, a user 1016 may have a list of items 1004 they desire and may progress through the facility 1002 picking items 1004 from inventory locations 1014 within the storage area 1008, and placing those items 1004 into a tote 1018. In other implementations, employees of the facility 1002 may pick items 1004 using written or electronic pick lists derived from customer orders. These picked items 1004 may be placed into the tote 1018 as the employee progresses through the facility 1002. Picking may comprise one or more events 1024, such as the user 1016 in moving to the inventory location 1014, retrieval of the item 1004 from the inventory location 1014, and so forth.

After items 1004 have been picked, they may be processed at a transition area 1010. The transition area 1010 may be any designated area within the facility 1002 where items 1004 are transitioned from one location to another or from one entity to another. For example, the transition area 1010 may be a packing station within the facility 1002. When the item 1004 arrives at the transition area 1010, the items 1004 may be transitioned from the storage area 1008 to the packing station. The transitioning may comprise one or more events 1024. Information about the transition may be maintained by the inventory management system 1022 using the output data 1026 associated with those events 1024.

In another example, if the items 1004 are departing the facility 1002 a list of the items 1004 may be obtained and used by the inventory management system 1022 to transition responsibility for, or custody of, the items 1004 from the facility 1002 to another entity. For example, a carrier may accept the items 1004 for transport with that carrier accepting responsibility for the items 1004 indicated in the list. In another example, a customer may purchase or rent the items 1004 and remove the items 1004 from the facility 1002. The purchase or rental may comprise one or more events 1024.

The inventory management system 1022 may access or generate sensor data about the facility 1002 and the contents therein including the items 1004, the users 1016, the totes 1018, and so forth. The sensor data may be acquired by one or more of the sensors 1020, data provided by other systems, and so forth. For example, the sensors 1020 may include cameras 1020(1) configured to acquire image data of scenes in the facility 1002. The image data may comprise still images, video, or a combination thereof. The image data may be processed by the inventory management system 1022 to determine a location of the user 1016, the tote 1018, the identifier associated with the user 1016, and so forth. As used herein, the identifier associated with the user may represent a unique identifier of the user (e.g., number associated with user, username, etc.), an identifier that distinguishes the user amongst other users being located within the environment, or the like.

The inventory management system 1022, or systems coupled thereto, may be configured to determine the identifier associated with the user 1016, as well as to determine other candidate users. In one implementation, this determination may comprise comparing sensor data with previously stored identity data. For example, the identifier associated with the user 1016 may be identified by presenting a token carrying authentication credentials, providing a fingerprint, scanning a barcode or other type of unique identifier upon entering the facility, and so forth. The identifier associated with the user 1016 may be determined before, during, or after entry to the facility 1002. Determination of the user's 1016 identifier may comprise comparing sensor data associated with the user 1016 in the facility 1002 to previously stored user data.

In some instances, the inventory management system 1022 groups users within the facility into respective sessions. That is, the inventory management system 1022 may utilize the sensor data to determine groups of users that are effectively "together" (e.g., shopping together). In some instances, a particular session may include multiple users that entered the facility 1002 together and, potentially, that navigate the facility together. For example, when a family of two adults and two children enter the facility together, the inventory management system may associate each user with a particular session. Locating groups in addition to individual users may help in determining the outcome of individual events, given that users within a session may not only individually order, pick, return, or otherwise interact with items, but may also pass the items back and forth amongst each other. For instance, a child in the above example may pick the box of cereal before handing the box to her mother, who may place it in her tote 1018. Noting the child and the mother as belonging to the same session may increase the chances of successfully adding the box of cereal to the virtual shopping cart of the mother.

By determining the occurrence of one or more events 1024 and the output data 1026 associated therewith, the inventory management system 1022 is able to provide one or more services to the users 1016 of the facility 1002. By utilizing one or more human associates to process inquiry data and generate response data that may then be used to produce output data 1026, overall accuracy of the system may be enhanced. The enhanced accuracy may improve the user experience of the one or more users 1016 of the facility 1002. In some examples, the output data 1026 may be transmitted over a network 1030 to one or more servers 1032.

FIG. 11 illustrates a block diagram of the one or more servers 1032. The servers 1032 may be physically present at the facility 1002, may be accessible by the network 1030, or a combination of both. The servers 1032 do not require end-user knowledge of the physical location and configuration of the system that delivers the services. Common expressions associated with the servers 1032 may include "on-demand computing," "software as a service (SaaS)," "cloud services," "data centers," and so forth. Services provided by the servers 1032 may be distributed across one or more physical or virtual devices.

The servers 1032 may include one or more hardware processors 1102 (processors) configured to execute one or more stored instructions. The processors 1102 may comprise one or more cores. The servers 1032 may include one or more input/output (I/O) interface(s) 1104 to allow the processor 1102 or other portions of the servers 1032 to communicate with other devices. The I/O interfaces 1104 may comprise Inter-Integrated Circuit (I2C), Serial Peripheral Interface bus (SPI), Universal Serial Bus (USB) as promulgated by the USB Implementers Forum, and so forth. FIG. 11 also illustrates I/O devices 1106.

The servers 1032 may also include one or more communication interfaces 1108. The communication interfaces 1108 are configured to provide communications between the servers 1032 and other devices, such as the sensors 1020, the interface devices, routers, and so forth. The communication interfaces 1108 may include devices configured to couple to personal area networks (PANs), wired and wireless local area networks (LANs), wired and wireless wide area networks (WANs), and so forth. For example, the communication interfaces 1108 may include devices compatible with Ethernet, Wi-Fi™, and so forth. The servers 1032 may also include one or more busses or other internal communications hardware or software that allow for the transfer of data between the various modules and components of the servers 1032.

The servers 1032 may also include a power supply 1140. The power supply 1140 is configured to provide electrical power suitable for operating the components in the servers 1032.

The servers 1032 may further include one or more memories 1110. The memory 1110 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1110 provides storage of computer-readable instructions, data structures, program modules, and other data for the operation of the servers 1032. A few example functional modules are shown stored in the memory 1110, although the same functionality may alternatively be implemented in hardware, firmware, or as a system on a chip (SOC).

The memory 1110 may include at least one operating system (OS) component 1112. The OS component 1112 is configured to manage hardware resource devices such as the I/O interfaces 1104, the communication interfaces 1108, and provide various services to applications or components executing on the processors 1102. The OS component 1112 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 1110. These components may be executed as foreground applications, background tasks, daemons, and so forth. A communication component 1114 may be configured to establish communications with one or more of the sensors 1020, one or more of the devices used by associates, other servers 1032, or other devices. The communications may be authenticated, encrypted, and so forth.

The memory 1110 may store an inventory management system 1116. The inventory management system 1116 is configured to provide the inventory functions as described herein with regard to the inventory management system 1022. For example, the inventory management system 1116 may track movement of items 1004 in the facility 1002, generate user interface data, and so forth.

The inventory management system 1116 may access information stored in one or more data stores 1118 in the memory 1110. The data store 1118 may use a flat file, database, linked list, tree, executable code, script, or other data structure to store the information. In some implementations, the data store 1118 or a portion of the data store 1118 may be distributed across one or more other devices including other servers 1032, network attached storage devices, and so forth.

The data store 1118 may include physical layout data 1120. The physical layout data 1120 provides a mapping of physical locations within the physical layout of devices and objects such as the sensors 1020, inventory locations 1014, and so forth. The physical layout data 1120 may indicate the coordinates within the facility 1002 of an inventory location 1014, sensors 1020 within view of that inventory location 1014, and so forth. For example, the physical layout data 1120 may include camera data comprising one or more of a location within the facility 1002 of a camera 1020(1), orientation of the camera 1020(1), the operational status, and so forth. Continuing example, the physical layout data 1120 may indicate the coordinates of the camera 1020(1), pan and tilt information indicative of a direction that the field of view 1028 is oriented along, whether the camera 1020(1) is operating or malfunctioning, and so forth.

In some implementations, the inventory management system 1116 may access the physical layout data 1120 to determine if a location associated with the event 1024 is within the field of view 1028 of one or more sensors 1020. Continuing the example above, given the location within the facility 1002 of the event 1024 and the camera data, the inventory management system 1116 may determine the cameras 1020(1) that may have generated images of the event 1024.

The item data 1122 comprises information associated with the items 1004. The information may include information indicative of one or more inventory locations 1014 at which one or more of the items 1004 are stored. The item data 1122 may also include event data, SKU or other product identifier, price, quantity on hand, weight, expiration date, images of the item 1004, detail description information, ratings, ranking, and so forth. Still, in some instances, the item data 1122 may include device data that associated items with devices that are used to track the locations of the items within the facility 1002. The inventory management system 1116 may store information associated with inventory management functions in the item data 1122.

The data store 1118 may also include sensor data 1124. The sensor data 1124 comprises information acquired from, or based on, the one or more sensors 1020. For example, the sensor data 1124 may comprise 3D information about an object in the facility 1002. As described above, the sensors 1020 may include a camera 1020(1), which is configured to acquire one or more images. These images may be stored as the image data 1126. The image data 1126 may comprise information descriptive of a plurality of picture elements or pixels. Non-image data 1128 may comprise information from other sensors 1020, such as input from microphones, weight sensors, and so forth.

User data 1130 may also be stored in the data store 1118. The user data 1130 may include identity data, information indicative of a profile, purchase history, location data, demographic data, and so forth. Individual users 1016 or groups of users 1016 may selectively provide user data 1130 for use by the inventory management system 1022. The individual users 1016 or groups of users 1016 may also authorize collection of the user data 1130 during use of the facility 1002 or access to user data 1130 obtained from other systems. For example, the user 1016 may opt-in to collection of the user data 1130 to receive enhanced services while using the facility 1002.

In some implementations, the user data 1130 may include information designating a user 1016 for special handling. For example, the user data 1130 may indicate that a particular user 1016 has been associated with an increased number of errors with respect to output data 1026. The inventory management system 1116 may be configured to use this information to apply additional scrutiny to the events 1024 associated with this user 1016. For example, events 1024 that include an item 1004 having a price or result above the threshold amount may be provided to the associates for processing regardless of the determined level of confidence in the output data 1026 as generated by the automated system.

The inventory management system 1116 may include one or more of a location component 1132, identification component 1134, event-determination component 1136, and inquiry component 1138, potentially amongst other components 1156.

The location component 1132 functions to locate items or users within the environment of the facility to allow the inventory management system 1116 to assign certain events to the correct users. That is, the location component 1132 may assign unique identifiers to users as they enter the facility and, with the users' consent, may locate the users throughout the facility 1002 over the time they remain in the facility 1002. The location component 1132 may perform this locating using sensor data 1124, such as the image data 1126. For example, the location component 1132 may receive the image data 1126 and analyze the image data 1126 to identify users from the images. After identifying a particular user within the facility, the location component 1132 may then locate the user within the images as the user moves throughout the facility 1002. Further, should the location component 1132 temporarily "lose" a particular user, the location component 1132 may again attempt to identify the users within the facility based on facial recognition, and/or using other techniques such as voice recognition, or the like.

Therefore, upon receiving the indication of the time and location of the event in question, the location component 1132 may query the data store 1118 to determine which one or more users were at or within a threshold distance of the location of the event at the particular time of the event. Further, the location component 1132 may assign different confidence levels to different users, with the confidence levels indicating how likely it is that each corresponding user is the user that is in fact associated with the event of interest.

The location component 1132 may access the sensor data 1124 in order to determine this location data of the user and/or items. The location data provides information indicative of a location of an object, such as the item 1004, the user 1016, the tote 1018, and so forth. The location may be absolute with respect to the facility 1002 or relative to another object or point of reference. Absolute terms may comprise a latitude, longitude, and altitude with respect to a geodetic reference point. Relative terms may include a location of 210.4 meters (m) along an x-axis and 710.2 m along a y-axis as designated by a floor plan of the facility 1002, 10.2 m from an inventory location 1014 along a heading of 11010°, and so forth. For example, the location data may indicate that the user 1016(1) is 210.2 m along the aisle 1012(1) and standing in front of the inventory location 1014. In comparison, a relative location may indicate that the user 1016(1) is 32 cm from the tote 1018 at a heading of 73° with respect to the tote 1018. The location data may include orientation information, such as which direction the user 1016 is facing. The orientation may be determined by the relative direction of the user's 1016 body is facing. In some implementations, the orientation may be relative to the interface device. Continuing the example, the location data may indicate that the user 1016(1) is oriented with a heading of 0°, or looking north. In another example, the location data may indicate that the user 1016 is facing towards the interface device.

The identification component 1134 is configured to identify an object. In one implementation, the identification component 1134 may be configured to identify an item 1004. In another implementation, the identification component 1134 may be configured to identify an identifier associated with the user 1016. For example, the identification component 1134 may process the image data 1126 and determine the identity data of the user 1016 depicted in the images by comparing the characteristics in the image data 1126 with previously stored results. The identification component 1134 may also access data from other sensors 1020, such as from an RFID reader, an RF receiver, fingerprint sensors, and so forth.

The event-determination component 1136 is configured to process the sensor data 1124 and generate output data 1026, and may include components described above. The event-determination component 1136 may access information stored in the data store 1118 including, but not limited to, event-description data 1142, confidence levels 1144, or threshold values 1146. In some instances, the event-determination component 1136 may be configured to perform some or all of the techniques described above with regards to the event-determination component 1136. For instance, the event-determination component 1136 may be configured to create and utilize event classifiers for identifying events (e.g., predefined activity) within image data, potentially without use of other sensor data acquired by other sensors in the environment.

The event-description data 1142 comprises information indicative of one or more events 1024. For example, the event-description data 1142 may comprise predefined profiles that designate movement of an item 1004 from an inventory location 1014 with the event 1024 of "pick". The event-description data 1142 may be manually generated or automatically generated. The event-description data 1142 may include data indicative of triggers associated with events occurring in the facility 1002. An event may be determined as occurring upon detection of the trigger. For example, sensor data 1124 such as a change in weight from a weight sensor 1020 at an inventory location 1014 may trigger detection of an event of an item 1004 being added or removed from the inventory location 1014. In another example, the trigger may comprise an image of the user 1016 reaching a hand toward the inventory location 1014. In yet another example, the trigger may comprise two or more users 1016 approaching to within a threshold distance of one another.

The event-determination component 1136 may process the sensor data 1124 using one or more techniques including, but not limited to, artificial neural networks, classifiers, decision trees, support vector machines, Bayesian networks, and so forth. For example, the event-determination component 1136 may use a decision tree to determine occurrence of the "pick" event 1024 based on sensor data 1124. The event-determination component 1136 may further use the sensor data 1124 to determine one or more tentative results 1148. The one or more tentative results 1148 comprise data associated with the event 1024. For example, where the event 1024 comprises a disambiguation of users 1016, the tentative results 1148 may comprise a list of possible user 1016 identities. In another example, where the event 1024 comprises a disambiguation between items, the tentative results 1148 may comprise a list of possible item identifiers. In some implementations, the tentative result 1148 may indicate the possible action. For example, the action may comprise the user 1016 picking, placing, moving an item 1004, damaging an item 1004, providing gestural input, and so forth.

In some implementations, the tentative results 1148 may be generated by other components. For example, the tentative results 1148 such as one or more possible identities or locations of the user 1016 involved in the event 1024 may be generated by the location component 1132. In another example, the tentative results 1148 such as possible items 1004 that may have been involved in the event 1024 may be generated by the identification component 1134.

The event-determination component 1136 may be configured to provide a confidence level 1144 associated with the determination of the tentative results 1148. The confidence level 1144 provides indicia as to the expected level of accuracy of the tentative result 1148. For example, a low confidence level 1144 may indicate that the tentative result 1148 has a low probability of corresponding to the actual circumstances of the event 1024. In comparison, a high confidence level 1144 may indicate that the tentative result 1148 has a high probability of corresponding to the actual circumstances of the event 1024.

In some implementations, the tentative results 1148 having confidence levels 1144 that exceed the threshold may be deemed to be sufficiently accurate and thus may be used as the output data 1026. For example, the event-determination component 1136 may provide tentative results 1148 indicative of the three possible items 1004(1), 1004(2), and 1004(3) corresponding to the "pick" event 1024. The confidence levels 1144 associated with the possible items 1004(1), 1004(2), and 1004(3) may be 210%, 70%, 102%, respectively. Continuing the example, the threshold value 1146 may be set such that confidence level 1144 of 100% are deemed to be sufficiently accurate. As a result, the event-determination component 1136 may designate the "pick" event 1024 as involving item 1004(3).

The inquiry component 1138 may be configured to use at least a portion of the sensor data 1124 associated with the event 1024 to generate inquiry data 1150. In some implementations, the inquiry data 1150 may include one or more of the tentative results 1148 or supplemental data 1152. The inquiry component 1138 may be configured to provide inquiry data 1150 to one or more devices associated with one or more human associates.

An associate user interface is presented on the respective devices of associates. The associate may generate response data 1154 by selecting a particular tentative result 1148, entering new information, indicating that they are unable to answer the inquiry, and so forth.

The supplemental data 1152 comprises information associated with the event 1024 or that may be useful in interpreting the sensor data 1124. For example, the supplemental data 1152 may comprise previously stored images of the items 1004. In another example, the supplemental data 1152 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 1126 during presentation to an associate.

The inquiry component 1138 processes the response data 1154 provided by the one or more associates. The processing may include calculating one or more statistical results associated with the response data 1154. For example, statistical results may include a count of the number of times associates selected a particular tentative result 1148, determination of a percentage of the associates that selected a particular tentative result 1148, and so forth.

The inquiry component 1138 is configured to generate the output data 1026 based at least in part on the response data 1154. For example, given that a majority of the associates returned response data 1154 indicating that the item 1004 associated with the "pick" event 1024 is item 1004(10), the output data 1026 may indicate that the item 1004(10) was picked.

The inquiry component 1138 may be configured to selectively distribute inquiries to particular associates. For example, some associates may be better suited to answering particular types of inquiries. Performance data, such as statistical data about the performance of the associates, may be determined by the inquiry component 1138 from the response data 1154 provided by the associates. For example, information indicative of a percentage of different inquiries in which the particular associate selected response data 1154 that disagreed with the majority of associates may be maintained. In some implementations, test or practice inquiry data 1150 having a previously known correct answer may be provided to the associate for training or quality assurance purposes. The determination of the set of associates to use may be based at least in part on the performance data.

By using the inquiry component 1138, the event-determination component 1136 may be able to provide high reliability output data 1026 that accurately represents the event 1024. The output data 1026 generated by the inquiry component 1138 from the response data 1154 may also be used to further train the automated systems used by the inventory management system 1116. For example, the sensor data 1124 and the output data 1026, based on response data 1154, may be provided to one or more of the components of the inventory management system 1116 for training in process improvement. Continuing the example, this information may be provided to an artificial neural network, Bayesian network, and so forth, to further train these systems such that the confidence level 1144 and the tentative results 1148 produced in the future for the same or similar input is improved. Finally, as FIG. 11 illustrates, the servers 1032 may store and/or utilize other data 10108.

In some instances, the server(s) 1032 may further store the timestamp data 602, timestamp data 1158 representing locations of users 1016 over time, and other data 1160.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

The invention claimed is:

1. A system comprising:
one or more processors; and
one or more computer-readable media storing instructions that, when executed by the one or more processors, cause the one or more processors to perform operations comprising:
storing first location data associated with a first reader of a facility;
storing second location data associated with a second reader of the facility;
receiving first image data generated by a first camera of the facility;
analyzing the first image data to determine that a user was located at a first location within the facility at a first time;
receiving first sensor data generated by the first reader of the facility, the first sensor data representing an identifier associated with a tag attached to an item;
analyzing the first sensor data to determine that the first reader detected the tag;
based at least in part on the first reader detecting the tag, determining, using the first location data, that the item was located at a second location within the facility at the first time;

determining that the second location of the item was
proximate to the first location of the user at the first
time;
determining, based at least in part on determining the
second location of the item was proximate to the first
location of the user, a first probability that the user
was in possession of the item at the first time;
receiving second image data generated by a second
camera of the facility;
analyzing the second image data to determine that the
user was located at a third location within the facility
at a second time;
receiving second sensor data generated by the second
reader, the second sensor data representing the identifier the tag;
analyzing the second sensor data to determine that the
second reader detected the tag;
based at least in part on the second reader detecting the
tag, determining, using the second location data, that
the item was located at a fourth location within the
facility at the second time;
determining that the fourth location of the item was
proximate to the third location of the user at the
second time;
determining, based at least in part on determining the
fourth location of the item was proximate to the third
location of the user, a second probability by at least
increasing the first probability, the second probability that the user was in possession of the item at the
second time;
determining, based at least in part on the second
probability, that the user exited the facility with the
item; and
charging a payment instrument of the user for at least
a price of the item.

2. The system as recited in claim 1, wherein the user is a
first user; and wherein the operations further comprise:
analyzing the first image data to determine that a second
user was located at a fifth location within the facility at
the first time;
determining that the second location of the item was
located proximate to the fifth location of the second
user at the first time;
determining, based at least in part on determining the
second location of the item was located proximate to
the fifth location of the user, a third probability that the
second user was in possession of the item;
receiving third image data generated by a third camera of
the facility;
analyzing the third image data to determine that the
second user was located at a sixth location within the
facility at the second time;
determining that the fourth location of the item was not
located proximate to the sixth location of the second
user at the second time; and
determining, based at least in part on determining the
fourth location of the item was not located proximate to
the sixth location of the second user, a fourth probability that the second user was in possession of the item,
the fourth probability being less than the second probability.

3. The system as recited in claim 1, wherein:
determining that the second location of the item was
proximate to the first location of the user at the first
time comprises determining that the second location of
the item was located within a threshold distance to the
first location of the user at the first time; and determining that the fourth location of the item was
proximate to the third location of the user at the second
time comprises determining that the fourth location of
the item was located within the threshold distance to
the third location of the user at the second time.

4. A method comprising:
determining, based at least in part on first sensor data, that
a user was located at a first location within a facility at
a first time;
determining, based at least in part on second sensor data,
that an item was located proximate to the first location
at the first time;
determining, based at least in part on determining that the
item was located proximate to the first location at the
first time, a first probability that the user was in
possession of the item at the first time;
determining, based at least in part on third sensor data,
that the user was located at a second location within the
facility at a second time, the second time being later
than the first time;
determining, based at least in part on fourth sensor data,
that the item was located proximate to the second
location at the second time;
determining, based at least in part on determining that the
item was located proximate to the second location at
the second time, a second probability by increasing the
first probability, the second probability that the user
was in possession of the item at the second time; and
based at least in part on the second probability, associating
an identifier associated with the item with an account
associated with the user.

5. The method as recited in claim 4, further comprising:
determining that the second probability satisfies a threshold probability,
and wherein associating the identifier with the account is
based at least in part on the second probability satisfying the threshold probability.

6. The method as recited in claim 4, further comprising:
receiving the first sensor data generated by a first camera
at the first time;
receiving the second sensor data generated by a first
reader at the first time;
receiving the third sensor data generated by a second
camera at the second time; and
receiving the fourth sensor data generated by a second
reader at the second time.

7. The method as recited in claim 4, wherein the user is
a first user, and wherein the method further comprises:
determining, based at least in part on fifth sensor data, that
a second user was located at a third location within the
facility at the first time;
determining, based at least in part on the second sensor
data, that the item was located proximate to the third
location at the first time;
determining, based at least in part on sixth sensor data,
that the second user was located at a fourth location
within the facility at the second time; and
determining, based at least in part on the fourth sensor
data, that the item was not located proximate to the
fourth location at the second time.

8. The method as recited in claim 7, further comprising:
determining a third probability that the second user was in
possession of the item based at least in part on the item
being proximate to the third location at the first time
and the item not being proximate to the fourth location
at the second time, and wherein the second probability is greater than the third probability.

9. The method as recited in claim 4, further comprising:
determining, based at least in part on fifth sensor data, that the item was removed from an inventory location at a third time; and
determining, based at least in part on sixth sensor data, that the user was located proximate to the inventory location at the third time,
and wherein associating the identifier with the account is further based at least in part on determining that the user was located proximate to the inventory location at the third time.

10. The method as recited in claim 4, wherein:
determining that the item was located proximate to the first location of the user at the first time comprises determining, based at least in part on the second sensor data, that the item was located within a threshold distance to the first location of the user at the first time; and
determining that the item was located proximate to the second location of the user at the second time comprises determining, based at least in part on the fourth sensor data, that the item was located within the threshold distance to the second location of the user at the second time.

11. The method as recited in claim 4, further comprising:
generating, based at least in part on the first sensor data, a first timestamp indicating that the user was located at the first location at the first time;
generating, based at least in part on the second sensor data, a second timestamp indicating that the item was located at a third location within the facility at the first time;
generating, based at least in part on the third sensor data, a third timestamp indicating that the user was located at the second location at the second time; and
generating, based at least in part on the fourth sensor data, a fourth timestamp indicating that the item was located at a fourth location within the facility at the second time.

12. The method as recited in claim 11, wherein:
determining that the item was located proximate to the first location at the first time comprises determining that the third location indicated by the third timestamp is proximate to the first location indicated by the first timestamp; and
determining that the item was located proximate to the second location at the second time comprises determining that the fourth location indicated by the fourth timestamp is proximate to the second location indicated by the second timestamp.

13. The method as recited in claim 4, further comprising:
storing item data that associates an identifier associated with a tag with the identifier associated with the item;
identifying the item based at least in part on the second sensor data, the second sensor data representing at least the identifier associated with the tag; and
identifying the item based at least in part on the fourth sensor data, the fourth sensor data representing at least the identifier associated with the tag.

14. A system comprising:
one or more processors; and
one or more computer-readable media storing instructions that, when executed by the one or more processors, cause the one or more processors to perform operations comprising:
determining, using first sensor data, that a user was located at a first location within a facility at a first time;
determining, using second sensor data, that an item was located at a second location within the facility at the first time;
determining, based at least in part on the user being located at the first location at the first time and the item being located at the second location at the first time, a first probability that the user was in possession of the item at the first time;
determining, using third sensor data, that the user was located at a third location within the facility at a second time;
determining, using fourth sensor data, that the item was located at a fourth location within the facility at the second time;
determining a second probability by increasing the first probability based at least in part on the user being located at the third location at the second time and the item being located at the fourth location at the second time, the second probability that the user was in possession of the item at the second time; and
based at least in part on the second probability, determining that the user was in possession of the item.

15. The system as recited in claim 14, the operations further comprising:
determining that a direction of travel associated with the user corresponds to a direction of travel associated with the item based at least in part on at least one of:
a first direction associated with the direction of travel of the user being approximately equal to a second direction associated with the direction of travel of the item; or
a first distance associated with the direction of travel of the user being approximately equal to a second distance associated with the direction of travel of the item,
wherein determining the second probability is further based at least in part on determining that the direction of travel associated with the user corresponds to the direction of travel associated with the item.

16. The system as recited in claim 14, the operations further comprising:
determining that the second probability satisfies a threshold probability,
wherein determining that the user was in possession of the item is based at least in part on the second probability satisfying the threshold probability.

17. The method as recited in claim 4, further comprising:
determining that the first probability does not satisfy a threshold probability;
determining not to associate the identifier associated with the item with the account associated with the user based at least in part on the first probability not satisfying the threshold probability; and
after determining that the first probability does not satisfy the threshold probability, determining that the second probability does satisfy the threshold probability,
wherein associating the identifier associated with the item with the account associated with the user is based at least in part on the second probability satisfying the threshold probability.

18. The method as recited in claim 4, further comprising:
determining a first weight associated with the item being located proximate to the first location at the first time, wherein determining the first probability is further based at least in part on the first weight; and determining a second weight associated with the item being located proximate to the second location at the second time, where determining the second probability is further based at least in part on the second weight.

19. The system as recited in claim 14, the operations further comprising:

determining a first direction of travel associated with the user based at least in part on the user being located at the first location at the first time;

determining a first direction of travel associated with the item based at least in part on the item being located at the second location at the first time;

determining that the first direction of travel associated with the user corresponds to the first direction of travel associated with the item, wherein determining the first probability is based at least in part on the first direction of travel associated with the user corresponding to the first direction of travel associated with the item;

determining a second direction of travel associated with the user based at least in part on the user being located at the third location at the second time;

determining a second direction of travel associated with the item based at least in part on the item being located at the fourth location at the second time; and determining that the second direction of travel associated with the user corresponds to the second direction of travel associated with the item, wherein determining the second probability by increasing the first probability is based at least in part on the second direction of travel associated with the user corresponding to the second direction of travel associated with the item.

20. The system as recited in claim 14, the operations further comprising:

determining that the second location of the item was proximate to the first location of the user at the first time, wherein determining the first probability is based at least in part on the second location of the item being proximate to the first location of the user at the first time; and determining that the fourth location of the item was proximate to the third location of the user at the second time, wherein determining the second probability by increasing the first probability is based at least in part on the fourth location of the item being proximate to the third location of the user at the second time.

* * * * *